(12) United States Patent
Tsutaya et al.

(10) Patent No.: US 9,151,659 B2
(45) Date of Patent: Oct. 6, 2015

(54) FLEXURE ELEMENT WHERE THE GAP BETWEEN THE FIRST ARM AND THE SECOND ARM OR BETWEEN AN ARM AND THE STRAIN GENERATING REGION ARE EQUAL TO OR SMALLER THAN ONE HALF THE THICKNESS

(71) Applicant: Tanita Corporation, Tokyo (JP)

(72) Inventors: Takao Tsutaya, Chiba (JP); Shinji Sasaki, Akita (JP)

(73) Assignee: TANITA CORPORATION, Tokyo (JP)

( * ) Notice: Subject to any disclaimer, the term of this patent is extended or adjusted under 35 U.S.C. 154(b) by 259 days.

(21) Appl. No.: 13/830,960

(22) Filed: Mar. 14, 2013

(65) Prior Publication Data

US 2014/0083780 A1    Mar. 27, 2014

(30) Foreign Application Priority Data

Sep. 25, 2012  (JP) ................ 2012-211082
Sep. 25, 2012  (JP) ................ 2012-211083
Sep. 25, 2012  (JP) ................ 2012-211084
Sep. 25, 2012  (JP) ................ 2012-211085
Dec. 19, 2012  (JP) ................ 2012-277299

(51) Int. Cl.
*G01G 3/14* (2006.01)
*G01L 1/22* (2006.01)
*C22C 33/02* (2006.01)
(Continued)

(52) U.S. Cl.
CPC .. *G01G 3/12* (2013.01); *B22F 5/10* (2013.01); *G01G 3/00* (2013.01); *G01G 3/08* (2013.01); *G01G 3/1402* (2013.01); *G01L 1/2206* (2013.01); *C22C 33/02* (2013.01); *G01G 19/44* (2013.01); *Y10T 428/12014* (2015.01)

(58) Field of Classification Search
CPC ......... G01G 3/1402; G01G 3/08; G01G 3/12; G01L 1/2206
See application file for complete search history.

(56) References Cited

U.S. PATENT DOCUMENTS 3,263,496 A    8/1966 Fathauer
4,423,793 A    1/1984 Caris
(Continued)

FOREIGN PATENT DOCUMENTS

CN    201251479 Y    6/2009
GB       03846 A    0/1912
(Continued)

OTHER PUBLICATIONS

Korean Intellectual Property Office, Office Action for Korean Patent Application No. 10-2013-00111953, Jun. 25, 2014.
(Continued)

*Primary Examiner* — Randy W Gibson

(57) ABSTRACT

A flexure element used in a load cell comprises a rectangular strain region, two first arms, a first connection portion, which is connected to one end of the strain region and the first arms, two second arms, and a second connection portion which is connected to the other end of the strain region and the second arms, wherein one of the pair of first arms and the pair of second arms receives a load in a direction perpendicular to the flexure element, and the other of the pair of first arms and the pair of second arms is fixed to a support body, and a gap between the first arm and the second arm and a gap between the second arm and the strain region are equal to or smaller than a half of the thickness.

14 Claims, 16 Drawing Sheets

(51) Int. Cl.
*B22F 5/10* (2006.01)
*G01G 3/12* (2006.01)
*G01G 3/00* (2006.01)
*G01G 3/08* (2006.01)
*G01G 19/44* (2006.01)

(56) References Cited

U.S. PATENT DOCUMENTS

| | | | |
|---|---|---|---|
| 4,993,506 | A | 2/1991 | Angel |
| 5,510,581 | A | 4/1996 | Angel |
| 5,847,329 | A | 12/1998 | Anthoine-Milhomme et al. |
| 6,409,845 | B1 | 6/2002 | Tellenbach |
| D669,804 | S | 10/2012 | Ashino |
| D689,390 | S | 9/2013 | Okawa et al. |
| D689,391 | S | 9/2013 | Okawa et al. |
| D692,789 | S * | 11/2013 | Tsutaya ............... D10/94 |
| D712,288 | S * | 9/2014 | Yamada et al. ........ D10/94 |
| 2005/0132820 | A1 | 6/2005 | Eilersen |
| 2007/0084299 | A1 | 4/2007 | Germanton |
| 2008/0083290 | A1 | 4/2008 | Stadler |
| 2012/0118649 | A1 | 5/2012 | Clark et al. |
| 2014/0291042 | A1 * | 10/2014 | Tsutaya et al. ........ 177/211 |

FOREIGN PATENT DOCUMENTS

| | | |
|---|---|---|
| JP | S59-126757 A | 7/1984 |
| JP | S59-126760 A | 7/1984 |
| JP | H03-063831 U | 6/1991 |
| JP | H04-030449 U | 3/1992 |
| JP | H04-063027 U | 5/1992 |
| JP | 2977278 B | 8/1993 |
| JP | H05-505670 A | 8/1993 |
| JP | H09-021682 A | 1/1997 |
| JP | H10-500484 A | 1/1998 |
| JP | 2002-363609 A | 12/2002 |
| JP | 2005-241610 A | 9/2005 |
| JP | 2008-507687 A | 3/2008 |
| JP | 2008-309578 A | 12/2008 |
| JP | 2008-309719 A | 12/2008 |
| JP | 2010-230546 A | 10/2010 |
| JP | 2012-145389 A | 8/2012 |
| WO | 91/09286 A1 | 6/1991 |

OTHER PUBLICATIONS

Japan Patent Office, Office Action for Japanese Patent Application No. 2013-045150, May 14, 2013.
EPO, Extended European Search Report European Patent Application No. 13185282.4, Dec. 13, 2013.
Japan Patent Office, Office Action for Japanese Patent Application No. 2012-211085, Nov. 6, 2012.
Korean Intellectual Property Office, Decision of Rejection for Korean patent application 10-2013-0111953, Mar. 30, 2015.
State Intellectual Property Office of the People's Republic of China, Office Action for Chinese patent application No. 201310447691.5, Mar. 31, 2015.

* cited by examiner

| Shore hardness | A90 | A80 | A70 | A60 |
|---|---|---|---|---|
| Result | Good | Good | Allowable | Poor |

FLEXURE ELEMENT WHERE THE GAP BETWEEN THE FIRST ARM AND THE SECOND ARM OR BETWEEN AN ARM AND THE STRAIN GENERATING REGION ARE EQUAL TO OR SMALLER THAN ONE HALF THE THICKNESS

CROSS-REFERENCES TO RELATED APPLICATION

This application claims priority from Japanese Patent Application Serial Nos. 2012-211082, 2012-211083, 2012-211084, 2012-211085, which were respectively filed on Sep. 25, 2012, and Japanese Patent Application No. 2012-277299, which was filed on Dec. 19, 2012, the contents of which are incorporated herein by reference in their entireties.

TECHNICAL FIELD

The present invention relates to a flexure element which is used in a load cell for measuring a weight and which is deformed by a load transferred thereto and a weight measuring device which includes the flexure element.

BACKGROUND

For example, a weight measuring device such as a weight scale includes at least one load cell to which a load applied to a platform is transferred. The load cell includes a flexure element which is deformed by a load and a plurality of strain gauges attached to the flexure element. Japanese Patent No. 2977278 discloses such a flexure element.

SUMMARY

The flexure element is formed of high-strength metal, and is generally molded by punching which achieves high productivity in mass production. However, since the width of a portion to be punched by the punching needs to be equal to or larger than the thickness, there is a restriction that the flexure element to be manufactured increases in dimension. Further, it is difficult to form a complex shape such as a small gap or the like. In order to decrease the size of the flexure element so as to be manufactured by punching or form the complex shape, the flexure element is thinned or is formed of low-strength metallic material, but the mechanical strength of the flexure element deteriorates. Further, since the high-strength metallic material is used therefor, the punching causes shear drop, fracture surface, and burr in the punched surface. Accordingly, it is difficult to equalize the thicknesses and the widths of the flexure elements. For this reason, the weight measurement accuracy of the load cell is restricted.

Therefore, the invention provides a flexure element which is reduced in size, ensures a mechanical strength, and has a high dimension accuracy in thickness and width and provides a weight measuring device including the same.

The present flexure element is used in a load cell for measuring a weight, which is deformed by a load transferred thereto, and is formed by powdered metallurgy. According to embodiments of the present invention, since the flexure element is made by the powdered metallurgy, the flexure element may be decreased in size and the mechanical strength thereof may be ensured. Further, since the dimension accuracy in the thickness and the width of the flexure element is high, the weight measurement accuracy of the load cell is improved.

According to an embodiment, the flexure element is used in a load cell for measuring a weight, is deformed by a load transferred thereto, is formed by powdered metallurgy, and has an axisymmetric shape and an even thickness. The flexure element includes: a rectangular strain region which is disposed at the center thereof, extends in the same direction as that of a symmetric axis thereof, and has one end and the other end; two first arm portions which extend in parallel to the symmetric axis; a first connection portion which extends in a direction crossing the symmetric axis and is connected to one end of the strain region and the first arm portions; two second arm portions which are disposed closer to the strain region than the first arm portions and extend in parallel to the symmetric axis; and a second connection portion which extends in a direction crossing the symmetric axis and is connected to the other end of the strain region and the second arm portions, wherein one of the pair of first arm portions and the pair of second arm portions receives a load in a direction perpendicular to the flexure element, and the other of the pair of first arm portions and the pair of second arm portions is fixed to a support body, and wherein a gap between the first arm portion and the second arm portion and a gap between the second arm portion and the strain region are equal to or smaller than a half of the thickness.

In the embodiment, the gap between the first arm portion and the second arm portion and the gap between the second arm portion and the strain region are equal to or smaller than a half of the thickness. Since such gap is set to be small, the flexure element may be decreased in size. With regard to the high-strength metallic material which is suitable for the flexure element, when the punching is used, such gap can be only set to be equal to the thickness of the flexure element and may not be thinner than the thickness. However, when the powdered metallurgy is used, such gap may be thinned and the flexure element may be decreased in size. In the embodiment, the flexure element may be obtained by press-molding and sintering the metallic powder or may be obtained by the metallic powder injection molding method. That is, in the embodiment, as the method for powdered metallurgy, the metallic powder may be press-molded and sintered, and the metallic powder injection molding method may be employed.

According to another embodiment, the flexure element is used in a load cell for measuring a weight, is deformed by a load transferred thereto, is obtained by press-molding and sintering a metallic powder including at least vanadium (V) and chrome (Cr) and mainly including iron (Fe), and has an axisymmetric shape, the flexure element including: a rectangular strain region which is disposed at the center thereof, extends in the same direction as that of the symmetric axis, and has one end and the other end; two first arm portions which extend in parallel to the symmetric axis; a first connection portion which extends in a direction crossing the symmetric axis and is connected to one end of the strain region and the first arm portions; two second arm portions which are disposed closer to the strain region than the first arm portions and extend in parallel to the symmetric axis; and a second connection portion which extends in a direction crossing the symmetric axis and is connected to the other end of the strain region and the second arm portions, wherein one of the pair of first arm portions and the pair of second arm portions receives a load in a direction perpendicular to the flexure element, and the other of the pair of first arm portions and the pair of second arm portions is fixed to a support body.

In the embodiment, since the flexure element may be obtained by press-molding and sintering the metallic powder which includes at least vanadium and chrome and mainly includes iron, the flexure element with a complex shape may be decreased in size and the mechanical strength thereof may be ensured.

The length of each first arm portion in a direction perpendicular to the symmetric axis of the flexure element is 1.3 times or more the length of the strain region in the direction crossing the symmetric axis of the flexure element. Each first arm portion is provided with a first penetration hole, and may be screw-fixed to another component by using the penetration hole. When the gap between two outer side surfaces of each of first arm portions is large, it is possible to decrease the residual stress in the first arm portion caused by screwing torque generated when fastening the screw. Since the residual stress adversely affects the weight measurement accuracy of the load cell, it is desirable that the residual stress be small. When the length of each first arm portion in the direction perpendicular to the symmetric axis of the flexure element is 1.3 times or more the length of the strain region in the direction crossing the symmetric axis of the flexure element, the residual stress is reduced, and hence the weight measurement accuracy of the load cell may be improved.

Preferably, the length of the first connection portion in a direction parallel to the symmetric axis of the flexure element is 1.4 times or more the length of the strain region in a direction crossing the symmetric axis of the flexure element. Each first arm portion is provided with a first penetration hole, and may be screw-fixed to another component by using the penetration hole. When the length of the first connection portion in a direction parallel to the symmetric axis is large, it is possible to decrease the residual stress in the first arm portion caused by screwing torque generated when fastening the screw. Since the residual stress adversely affects the weight measurement accuracy of the load cell, it is desirable that the residual stress be small. When the length of the first connection portion in the direction parallel to the symmetric axis of the flexure element is 1.4 times or more the length of the strain region in the direction crossing the symmetric axis of the flexure element, the residual stress is reduced, and hence the weight measurement accuracy of the load cell may be improved.

Each second arm portion may be provided with a second penetration hole.

A weight measuring device according to yet another embodiment, includes the flexure element and a load cell which includes a plurality of strain gauges attached to the flexure element and generating signals in response to deformation of the flexure element.

BRIEF DESCRIPTION OF THE DRAWINGS

Other features and advantages of the present flexure element and weight measuring device will be apparent from the ensuing description, taken in conjunction with the accompanying drawings, in which.

DESCRIPTION

Figure 1:
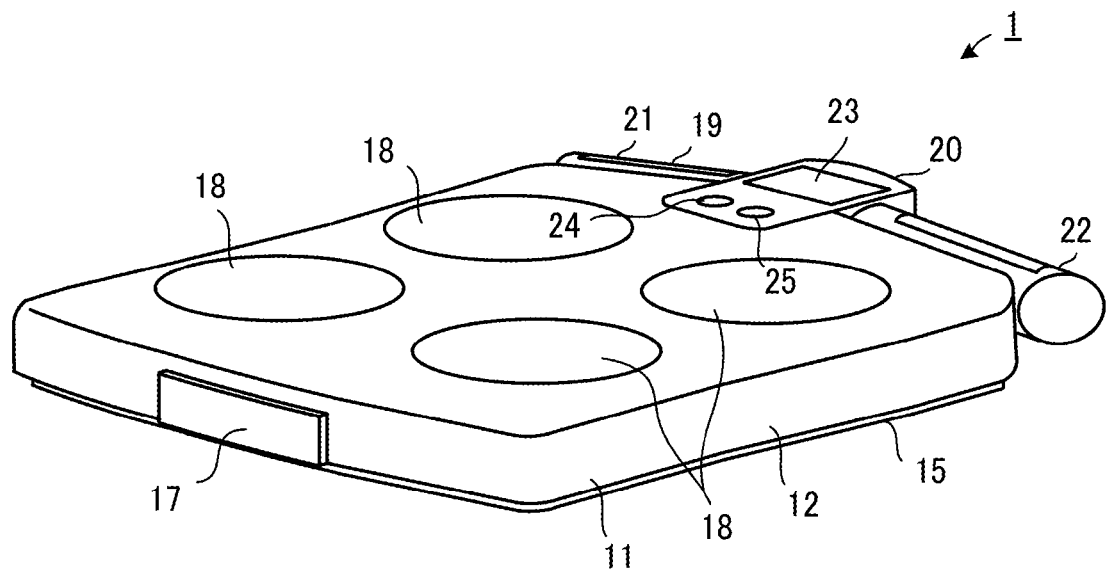
FIG. 1 is a perspective view illustrating a weight measuring device according to an embodiment of the invention when obliquely seen from the upper side.
Figure 2:
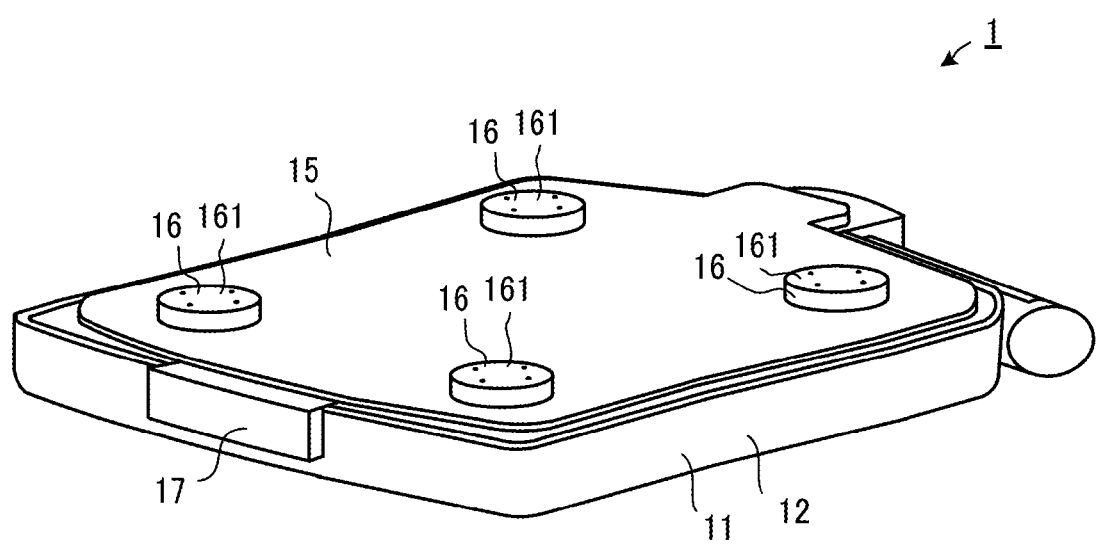
FIG. 2 is a perspective view illustrating the weight measuring device of FIG. 1 when obliquely seen from the downside.

Hereinafter, an embodiment according to the invention will be described referring to the accompanying drawings. FIGS. 1 and 2 illustrate a weight measuring device according to the embodiment of the invention. A weight measuring device 1 is a weight scale which measures a human weight, and is also a body composition meter which measures a body composition called a human body fat percentage. The weight measuring device 1 includes a casing 11, and the casing 11 includes a platform 12 and a base 15 fixed to the platform 12. As illustrated in FIG. 1, the platform 12 includes an approximately flat upper surface, which is directed so as to horizontally extend at time of a weight measurement. A human stands on the upper surface of the platform 12. That is, an object is placed on the platform 12 and the object's load is applied to the platform.

As illustrated in FIG. 2, the base 15 is formed in an approximately rectangular shape and is made from, for example, a rigid material such as stainless steel or resin. A leg 16 is disposed at each of four corners of the bottom surface of the base 15. During the weight measurement, the legs 16 are brought into contact with the floor. A separate component may be interposed between the leg 16 and the floor. Each of the legs 16 serves as a support member that supports the weight measuring device 1 and also serves as a leg of a load cell to be described later. During the weight measurement, the entire casing 11 including the platform 12 and the base 15 is displaced with respect to the legs 16 supported by the floor in response to the weight on the platform 12.

A power switch 17 which activates the weight measuring device 1 is attached to the casing 11, and the power switch 17 protrudes from a side surface of the platform 12. Since the weight measuring device 1 is used as a body composition meter, a plurality of electrode plates 18 are provided on the upper surface of the platform 12 as illustrated in FIG. 1. These electrode plates 18 are used to measure human subject's bioelectrical impedance. A human subject who stands on the platform 12 steps on the electrode plates 18 on both legs.

Figure 3:
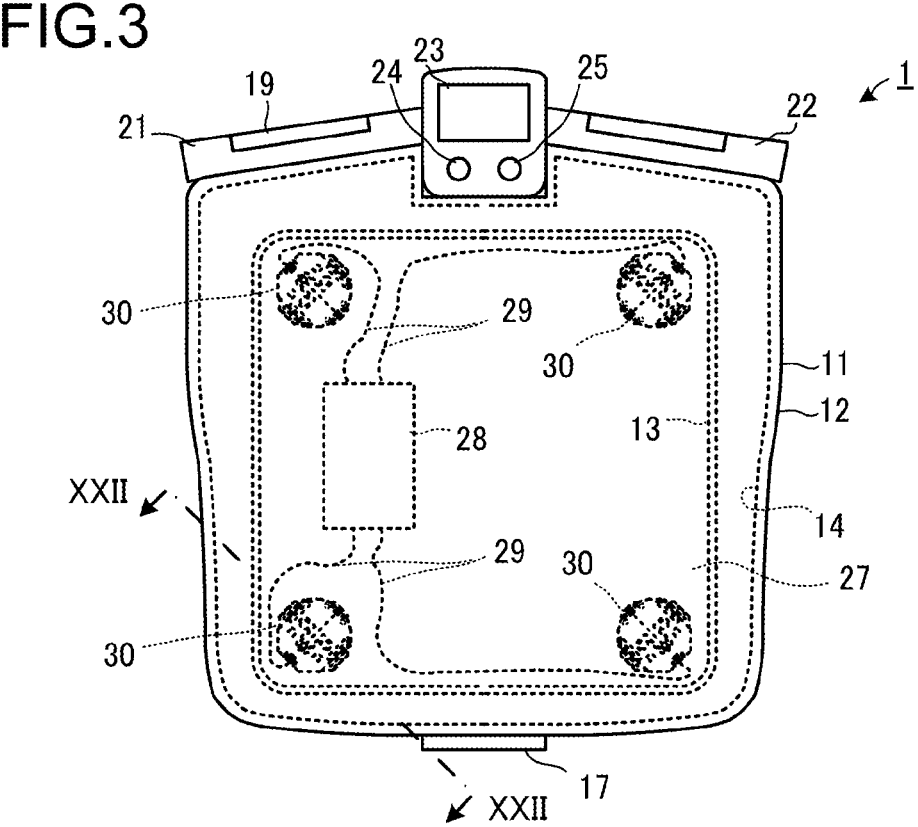
FIG. 3 is a top view of the weight measuring device of FIG. 1.

FIG. 3 is a top view illustrating the weight measuring device 1, and in FIG. 3, the electrode plates 18 are not drawn in the drawing. As illustrated in FIG. 3, the platform 12 includes, for example, a box-like inner cover 13 which is formed of a rigid material such as steel and an outer cover 14 which is disposed outside the inner cover 13 and is formed of resin. The outer cover 14 is an exterior cover of the platform 12 and insulates the metallic inner cover 13 from the electrode plates 18.

The weight measuring device 1 includes a handle unit 19. The handle unit 19 is connected to the casing 11 through a cable (not illustrated). The handle unit 19 includes a central operation box 20 and grips 21 and 22 which extend toward both sides of the operation box 20 (FIG. 1). The operation box 20 is provided with a display 23 which displays the weight and the body compositions of the human subject and operation buttons 24 and 25. Each of the grips 21 and 22 is provided with electrodes which are used to measure the human subject's bioelectrical impedance. These electrodes are gripped by both hands of the human subject who stands on the platform 12. The weight measuring device 1 according to the embodiment can be also used as a body composition meter, but since the embodiment relates to the weight measurement, the electrode plates 18 and the handle unit 19 are not essentially needed.

As illustrated in FIG. 3, the inner cover 13 of the platform 12 defines an accommodation space 27 together with the base 15 connected to the platform 12. Four load cell assemblies 30 are disposed inside the accommodation space 27 so as to measure the weight. However, the legs 16 of load cell assemblies 30 protrude downward from the base 15 as illustrated in FIG. 2.

Further, a substrate 28, on which a process circuit for processing signals supplied from the strain gauges of the load cell assemblies 30 is mounted, is disposed inside the accommodation space 27. The substrate 28 is connected to the strain gauges through cables 29. The process circuit on the substrate 28 calculates the human subject's weight based on signals supplied from the strain gauges of the load cell assemblies 30. Further, the process circuit on the substrate 28 is electrically connected to the electrode plates 18 on the platform 12 and the electrodes on the handle unit 19, and calculates the human subject's body compositions based on the weight and a change in the bioelectrical impedances at various positions of the human subject. The weight and the body compositions, which are calculated as described above, are displayed on the display 23.

Figure 4:
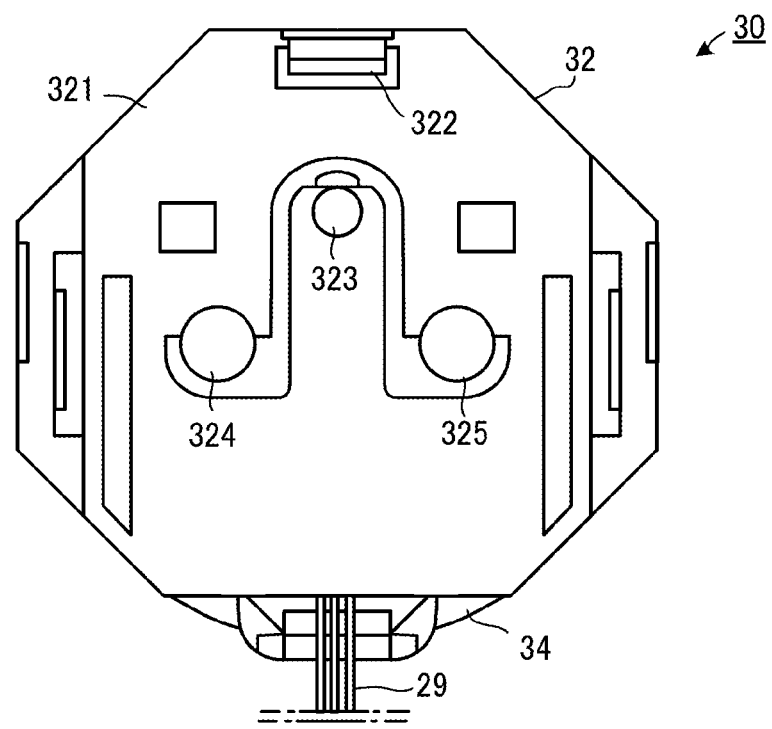
FIG. 4 is a top view illustrating a load cell assembly inside the weight measuring device of FIG. 1.
Figure 5:
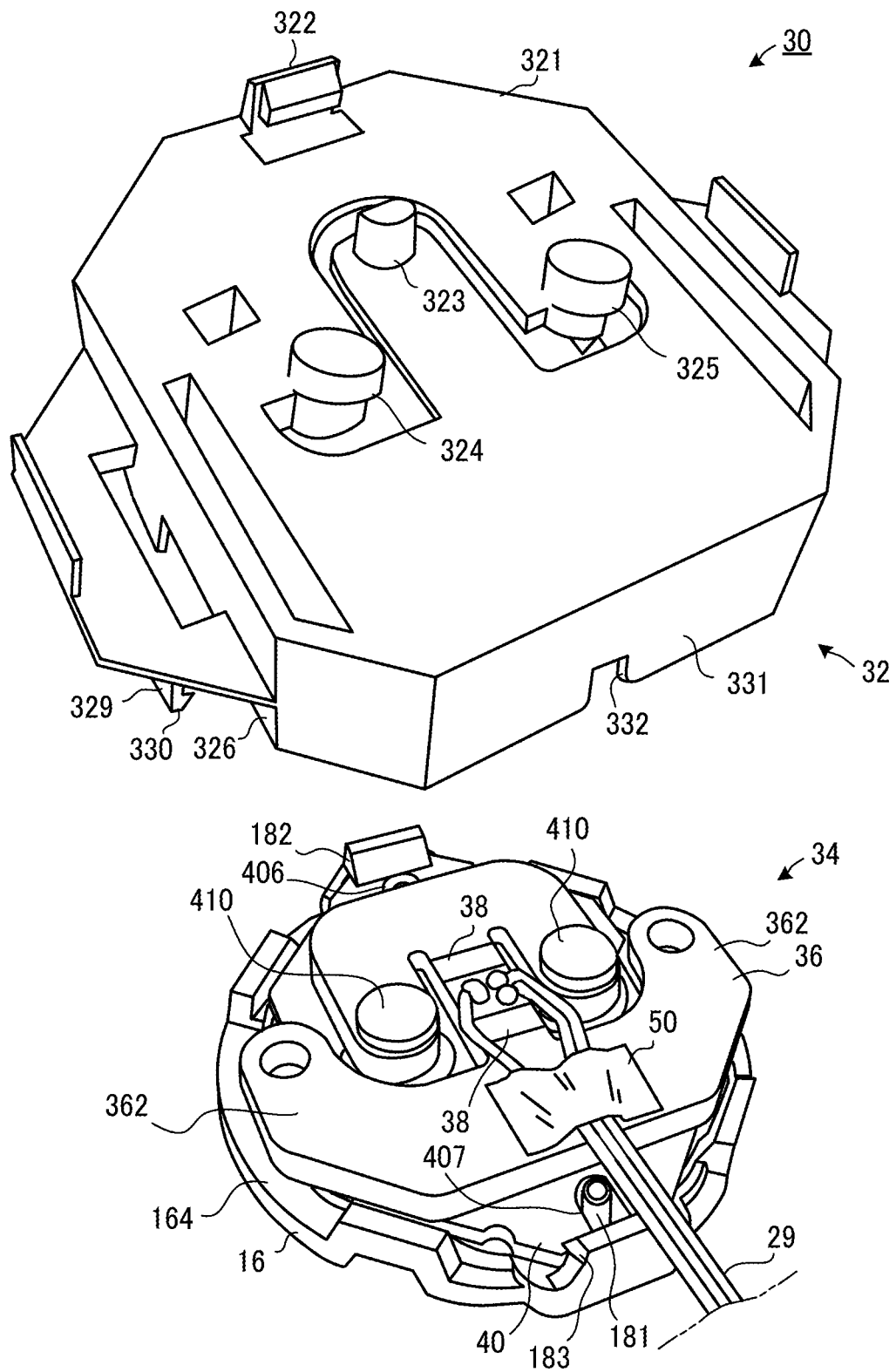
FIG. 5 is a perspective view of the disassembled load cell assembly.

As illustrated in FIGS. 4 and 5, each load cell assembly 30 includes a load transferring member (load cell holder) 32 and a load cell 34. The load transferring member 32 is formed of, for example, a rigid material such as resin. The load transferring member 32 covers the load cell 34 and is detachably attached to the load cell 34. Further, the load transferring member 32 is detachably attached to the inner cover 13 of the platform 12. The load transferring member 32 transfers a load transferred from the platform 12 to a flexure element 36 of the load cell 34.

As illustrated in FIG. 5, the load cell 34 includes the flexure element 36 which is deformed by the load transferred from the platform 12, a plurality of strain gauges 38 which are attached to the flexure element 36, a bridge 40 which supports the flexure element 36, and the leg 16 which supports the bridge 40. More specifically, the bridge 40 is supported by an elastic support member 42 (see FIGS. 14 and 15) and the elastic support member 42 is supported by the leg 16. However, the elastic support member 42 is not illustrated in FIG. 5. The cables 29 for the strain gauges 38 are bonded to the flexure element 36 by a tape 50.

Figure 8:
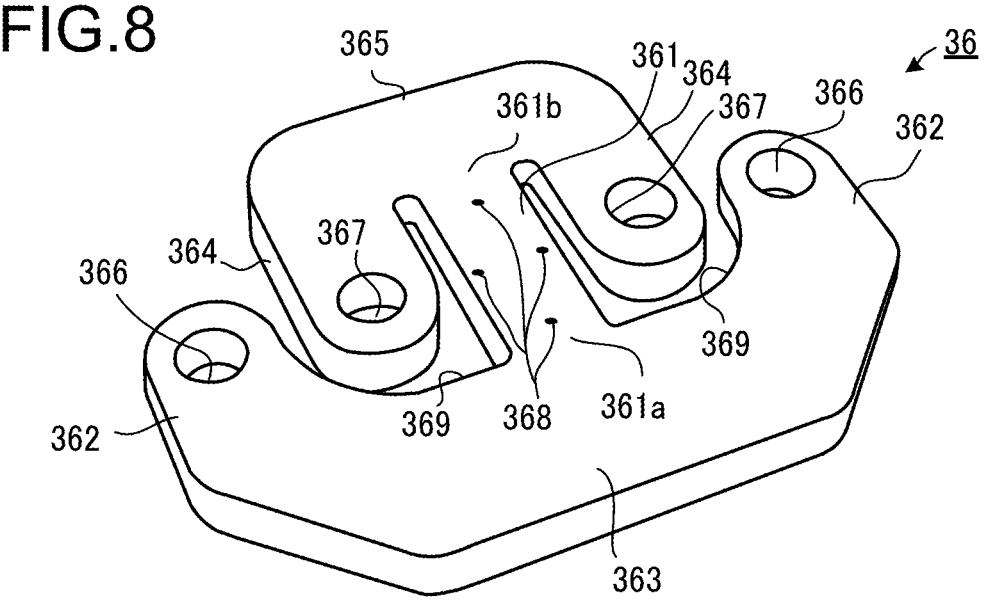
FIG. 8 is a perspective view illustrating a flexure element inside the load cell assembly when obliquely seen from the upper side.
Figure 9:
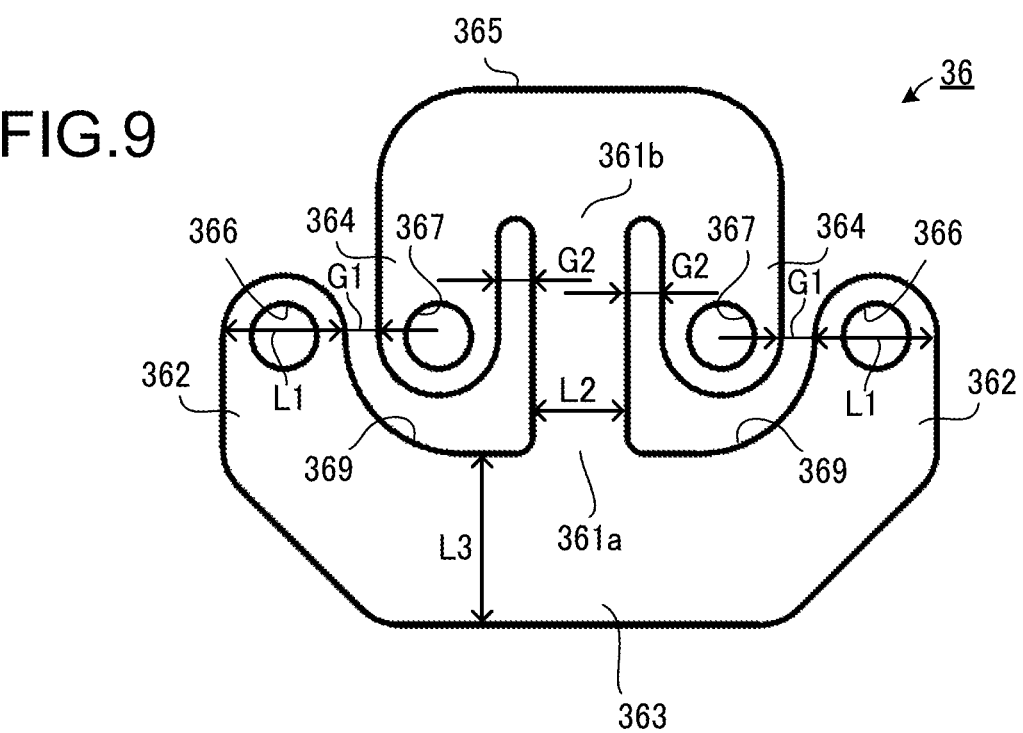
FIG. 9 is a bottom view illustrating the flexure element.

As illustrated in the perspective view from the oblique upper side of FIG. 8 and the bottom view of FIG. 9, the flexure element 36 is a single element which has an axisymmetric shape and an even thickness. The flexure element 36 is formed of, for example, a plate member that is formed of a highly rigid material such as carbon tool steel. The flexure element 36 includes a strain region 361 which is disposed at the center thereof, two first arm portions 362, two second arm portions 364, a first connection portion 363 which connects the strain region 361 to the first arm portions 362, and a second connection portion 365 which connects the strain region 361 to the second arm portions 364.

The strain region 361 is a rectangular portion which includes one end 361a and the other end 361b extending in the same direction as that of the symmetric axis of the flexure element 36. The strain region 361 is a region which is deformed the most by a load transferred from the platform 12 through the load transferring member 32. The strain gauges 38 are attached to the strain region 361 (see FIG. 5). The upper surface of the strain region 361 is provided with marks 368 which become guides for attaching the strain gauge 38 thereto.

Two first arm portions 362 extend in parallel to the symmetric axis of the flexure element 36. The first connection portion 363 extends in a direction perpendicularly crossing the symmetric axis of the flexure element 36, and is connected to the one end 361a of the strain region 361 and both first arm portions 362.

Two second arm portions 364 are disposed closer to the strain region 361 than the first arm portions 362, and extends in parallel to the symmetric axis of the flexure element 36. The second connection portion 365 extends in a direction perpendicularly crossing the symmetric axis of the flexure element 36, and is connected to the other end 361b of the strain region 361 and the second arm portions 364.

One end of each of the first arm portions 362 is formed in a semi-circular shape, and the end is provided with a circular first penetration hole 366. One end of each of the second arm portions 364 is formed in a semi-circular shape, and the end is provided with a circular second penetration hole 367. The center axes of the first penetration holes 366 and the second penetration holes 367 are arranged on a line perpendicularly crossing the symmetric axis of the flexure element 36. The flexure element 36 includes J-shaped symmetric grooves 369 which are formed at both sides of the strain region 361, and each groove 369 is surrounded by the strain region 361, the first arm portion 362, the first connection portion 363, the second arm portion 364, and the second connection portion 365.

In a state where the second arm portions 364 are supported by a support body (the bridge 40, which will be described later) disposed below the flexure element 36, a downward load is intensively applied to the first arm portions 362 from the upside in the vertical direction by the load transferring member 32, thereby deforming the strain region 361 (to be bent in an S-shape when seen from the lateral direction, that is, the direction parallel to a paper sheet showing FIG. 9). Each strain gauge 38 generates a signal in response to the deformation of the strain region 361 of the flexure element 36.

In the embodiment, a downward load is intensively applied to the first arm portions 362 from the upside in the vertical direction by the load transferring member 32. The second arm portions 364 are fixed to the support body (the bridge 40, which will be described later) disposed below the flexure element 36. However, the flexure element 36 is not limited to such use, and the flexure element 36 may be used so that a load is applied to the second arm portions 364 in the vertical direction and the first arm portions 362 are fixed to the support body. That is, one of the pair of first arm portions 362 and the pair of second arm portions 364 receives a load in a direction perpendicular to the flexure element 36, and the other of the pair of first arm portions 362 and the pair of second arm portions 364 is fixed to the support body. In either case, the flexure element 36 is used in a manner in which the strain region 361 is largely bent in an S-shape.

Figure 6:
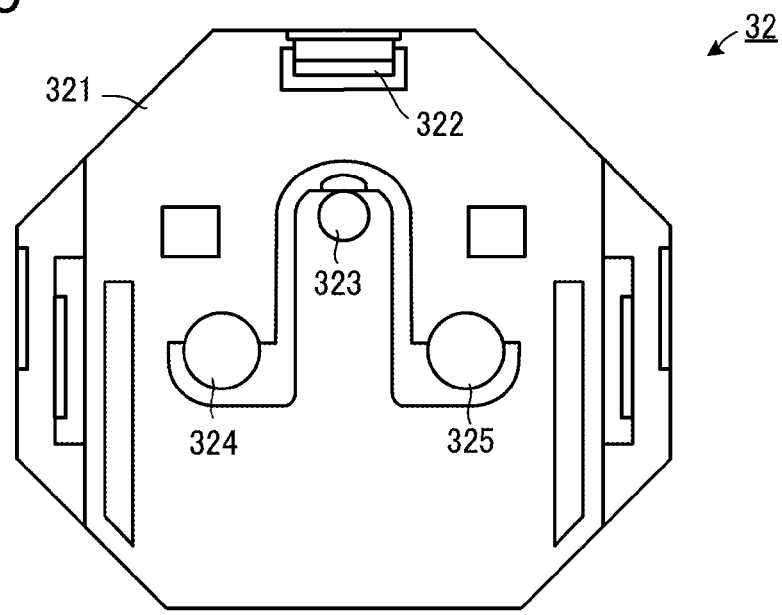
FIG. 6 is a top view illustrating a load transferring member inside the load cell assembly.

As illustrated in FIGS. 4 to 6, the load transferring member 32 includes an octagonal upper wall 321. The upper wall 321 is in contact with the inner cover 13 (FIG. 3) of the platform 12. The upper surface of the upper wall 321 is provided with a plurality of protrusions 322, 323, 324, and 325. The protrusions 322, 323, 324, and 325 are held in holes (not illustrated) formed in the inner cover 13. In this way, the load transferring member 32 is detachably attached to the inner cover 13 of the platform 12. The upper wall 321 is disposed parallel to the upper surface of the platform 12. The upper wall 321 covers the entire flexure element 36.

Figure 7:
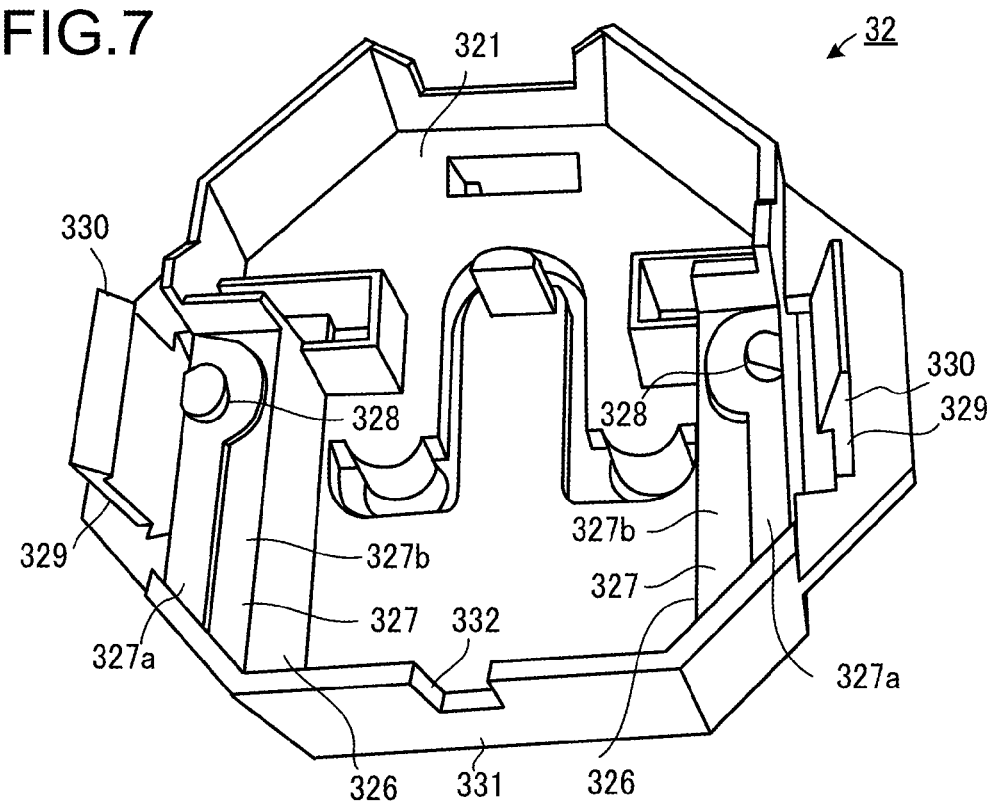
FIG. 7 is a perspective view illustrating the load transferring member when seen from the lower side.
Figure 10:
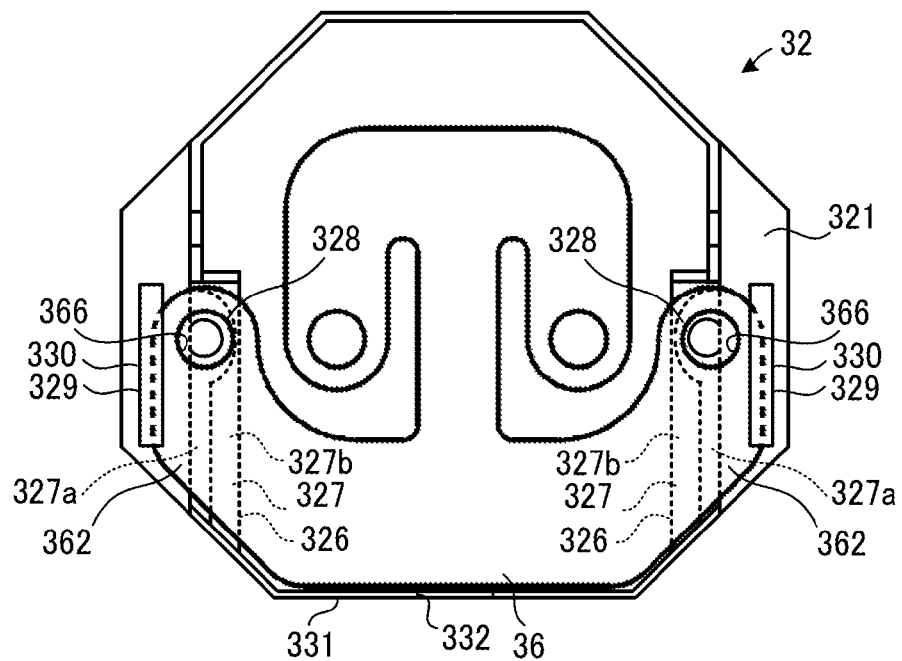
FIG. 10 is a bottom view illustrating the load transferring member and the flexure element which are coupled to each other.

As illustrated in FIGS. 5, 7, and 10, the load transferring member 32 includes two side walls 326 which extend downward from the upper wall 321. As illustrated in the bottom view of FIG. 10, each side wall 326 includes a lower region 327 which faces the first arm portion 362 of the flexure element 36. Each lower region 327 includes a flat lower contact surface 327a which comes into surface-contact with part of the first arm portion 362 of the flexure element 36 and a flat lower non-contact surface 327b which faces the first arm portion 362 of the flexure element 36 in a non-contact state. The lower contact surface 327a and the lower non-contact surface 327b extend in parallel to the symmetric axis of the flexure element 36. Further, the lower contact surface 327a and the lower non-contact surface 327b are disposed in parallel to the upper wall 321 and further the upper surface of the platform 12. For this reason, the surfaces 327a and 327b are directed so as to extend horizontally during the weight measurement. A step is formed between the lower contact surface 327a and the lower non-contact surface 327b.

As illustrated in the bottom view of FIG. 10, each first arm portion 362 of the flexure element 36 includes the first penetration hole 366 whose axis extends in the vertical direction during the weight measurement, and each lower region 327 of the side wall 326 of the load transferring member 32 is provided with a protrusion 328 which is inserted into the first penetration hole 366. The lower contact surface 327a also extend to the periphery of the protrusion 328. The load transferring member 32 further includes two outer side walls 329 which are disposed at the outside of the two side walls 326 and extend in parallel to the two side walls 326, and each outer side wall 329 is provided with a hook 330 to which the first arm portion 362 of the flexure element 36 is hooked.

As illustrated in FIG. 7, the load transferring member 32 further includes an end wall 331 which connects the two side walls 326 to each other. The end wall 331 is provided with a notch 332, and the cables 29 for the strain gauges 38 passes through the notch 332 (FIG. 5).

Figure 11:
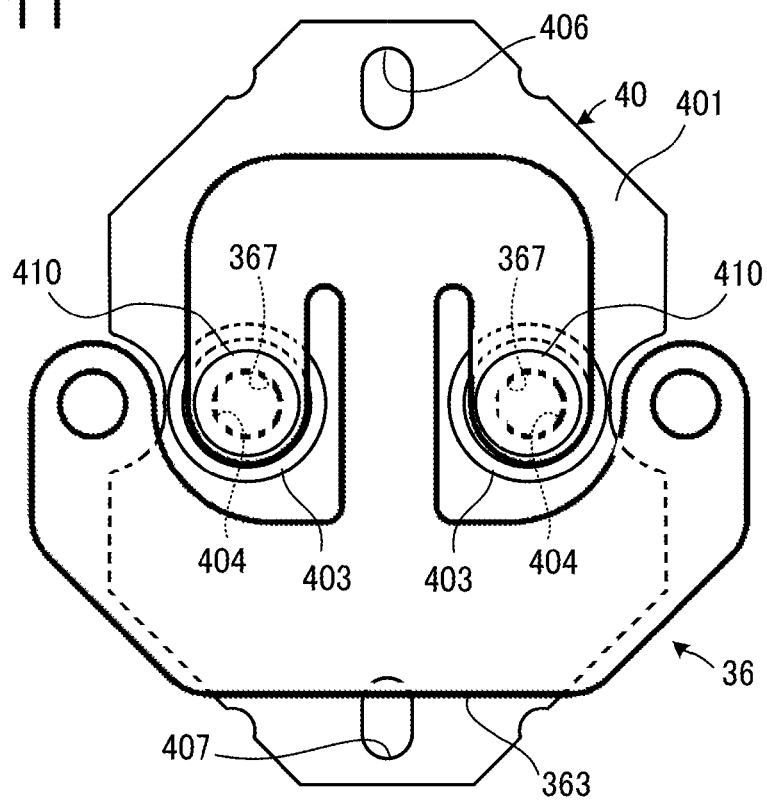
FIG. 11 is a top view illustrating the flexure element and a bridge which are coupled to each other.
Figure 12:
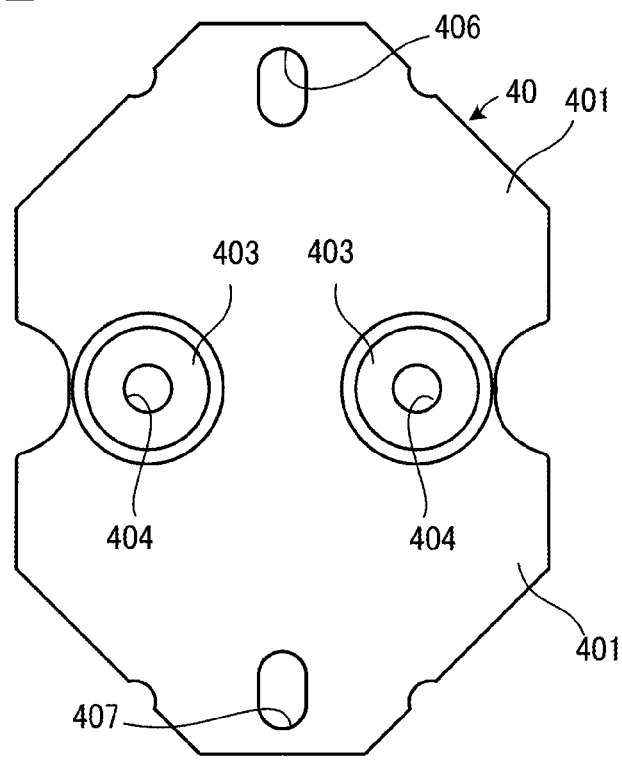
FIG. 12 is a top view illustrating the bridge.
Figure 13:
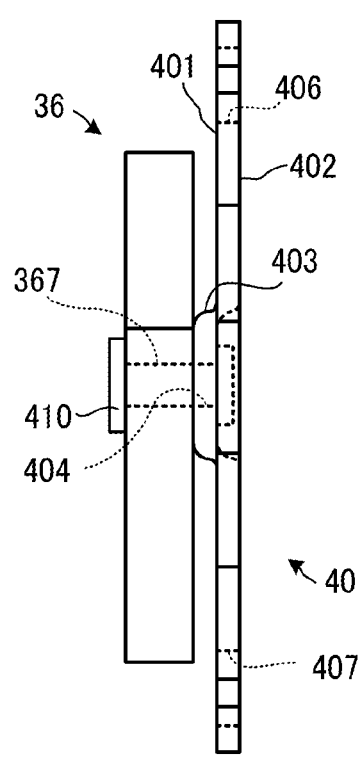
FIG. 13 is a side view illustrating the flexure element and the bridge which are coupled to each other in FIG. 11.

As illustrated in FIGS. 11 and 13, the flexure element 36 is supported while being fixed to the bridge 40. The bridge 40 is, for example, a single member that is formed of a rigid material such as steel. As illustrated in FIGS. 12 and 13, the bridge 40 is a plate which has an approximately octagonal outline and an approximately even thickness, and includes an approximately flat upper surface 401 and an approximately flat lower surface 402. The upper surface 401 and the lower surface 402 may be directed so as to extend horizontally during the weight measurement.

A boss 403 which has a circular outline is formed at two positions of the bridge 40. The boss 403 may be formed by, for example, press-molding. The surfaces of two bosses 403 are substantially flat, and brought in contact with the lower surface of (the surface without the strain gauges 38) of the flexure element 36. A penetration hole 404 is formed at the center of each boss 403.

Two penetration holes 404 of the bridge 40 respectively overlap two second penetration holes 367 of the flexure element 36, and a rivet 410 passes through the penetration hole 404 and the second penetration hole 367. The flexure element 36 and the bridge 40 are fixed by the two rivets 410. As illustrated in FIG. 13, in the embodiment, one end of the rivet 410 protrudes from the upper surface of the flexure element 36, and the other head portion of the rivet 410 is disposed in a space at the rear side of the boss 403 of the bridge 40 so as not to protrude from the lower surface 402 of the bridge 40. When the protrusion amount of the rivet 410 is sufficiently small, the elastic support member 42, which will be described later, adheres to the lower surface 402 of the bridge 40 without being broken or deformed by the rivet 410.

The boss 403 of the bridge 40 serves as a spacer which ensures a space between the flexure element 36 and the upper surface 401 of the bridge 40. That is, even when the flexure element 36 is deformed, the first connection portion 363 etc. of the flexure element 36 is prevented from abutting against the upper surface 401 of the bridge 40.

Further, the bridge 40 is provided with oval penetration holes 406 and 407. The penetration holes 406 and 407 are used while being attached to the leg 16, which will be described later.

Figure 14:
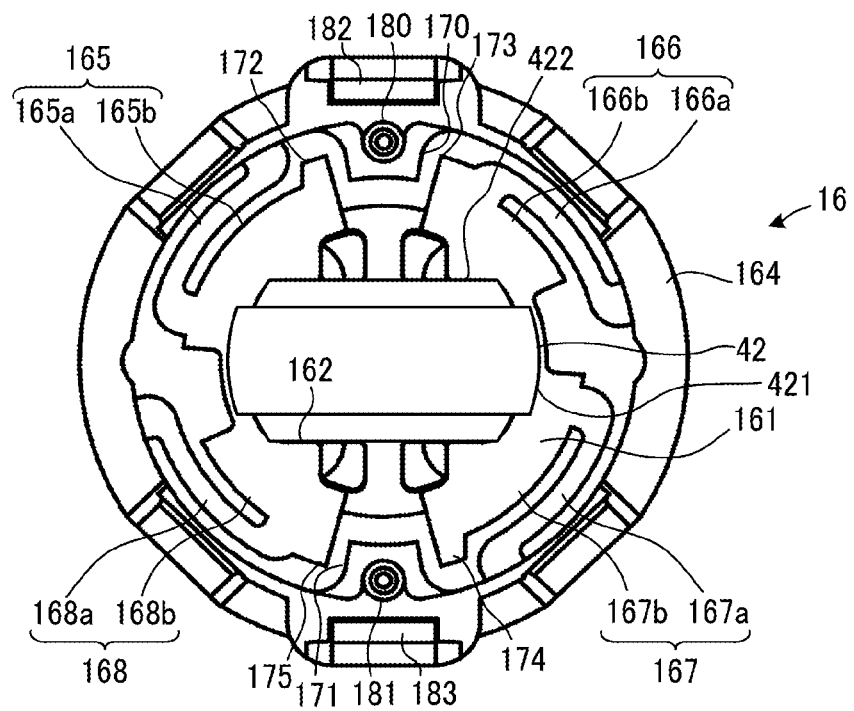
FIG. 14 is a top view illustrating a leg and an elastic support member inside the load cell assembly.
Figure 15:
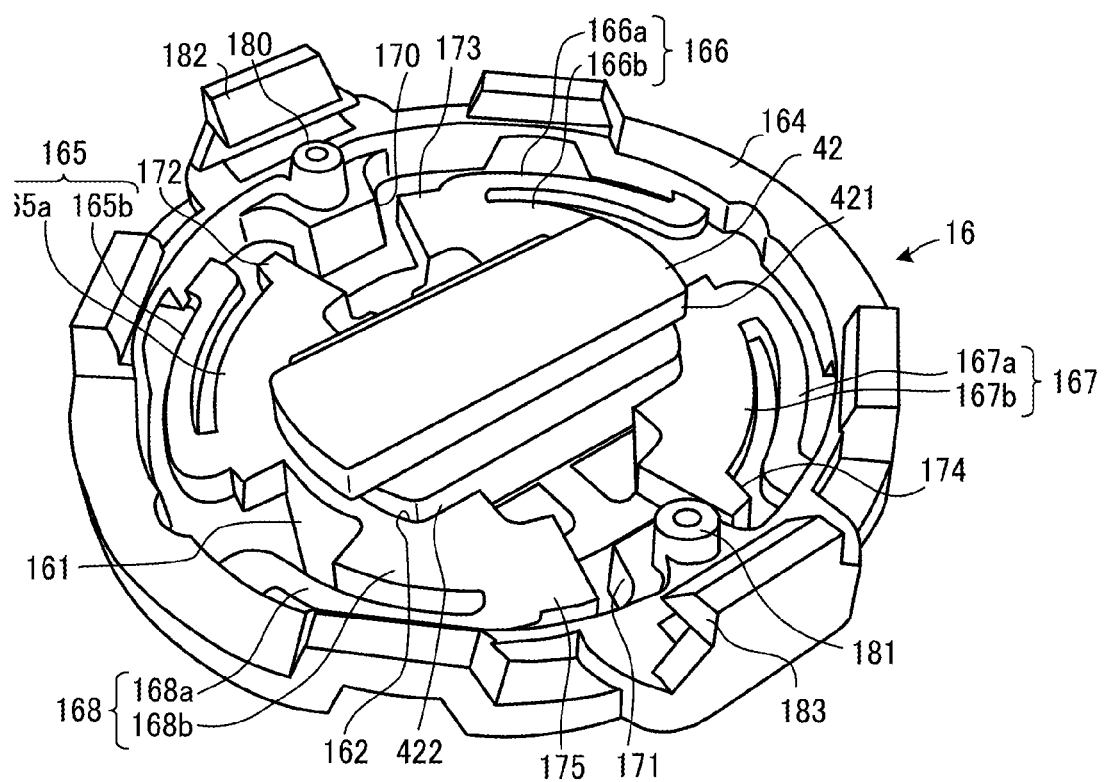
FIG. 15 is a perspective view illustrating the leg and the elastic support member.
Figure 16:
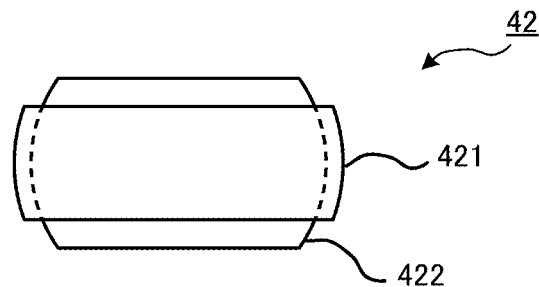
FIG. 16 is a top view illustrating the elastic support member.

The bridge 40 is supported by the elastic support member 42 illustrated in FIGS. 14 and 15, and the elastic support member 42 is supported by the leg 16. The elastic support member 42 is a single member that is formed of rubber. As illustrated in FIGS. 14 to 16, the elastic support member 42 includes an upper portion 421 which is formed in an approximately parallelepiped shape and has both circular-arc ends in the length direction and a lower portion 422 which is formed in an approximately parallelepiped shape and has both circular-arc ends in the length direction. The length of the upper portion 421 in the length direction is larger than that of the lower portion 422, and the width of the upper portion 421 is smaller than that of the lower portion 422.

In the embodiment, the upper surface of the elastic support member 42 is approximately flat. However, the upper surface of the elastic support member 42 may be formed in a circular-arc shape, and the upper surface may have an uneven portion. The lower surface 402 of the bridge 40 adheres to the upper surface of the elastic support member 42. The bridge 40 is disposed with respect to the elastic support member 42 so that the two rivets 410 are arranged in parallel in the longitudinal direction of the elastic support member 42. The lower portion 422 of the elastic support member 42 is fitted into the leg 16, and the elastic support member 42 is supported by the leg 16.

Figure 17:
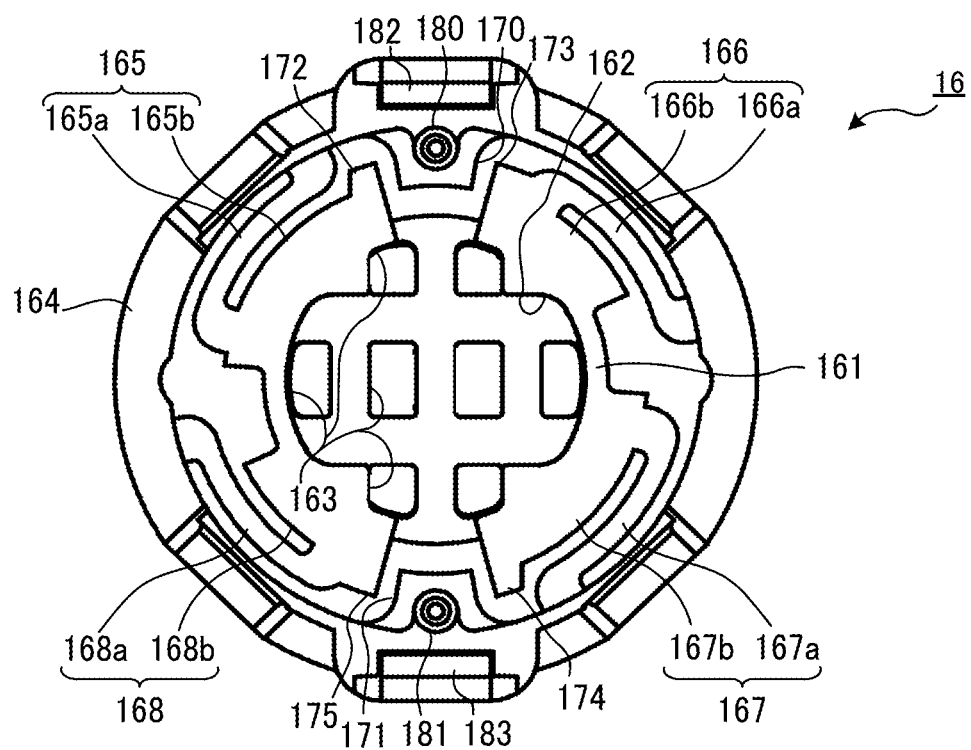
FIG. 17 is a top view illustrating the leg.
Figure 18:
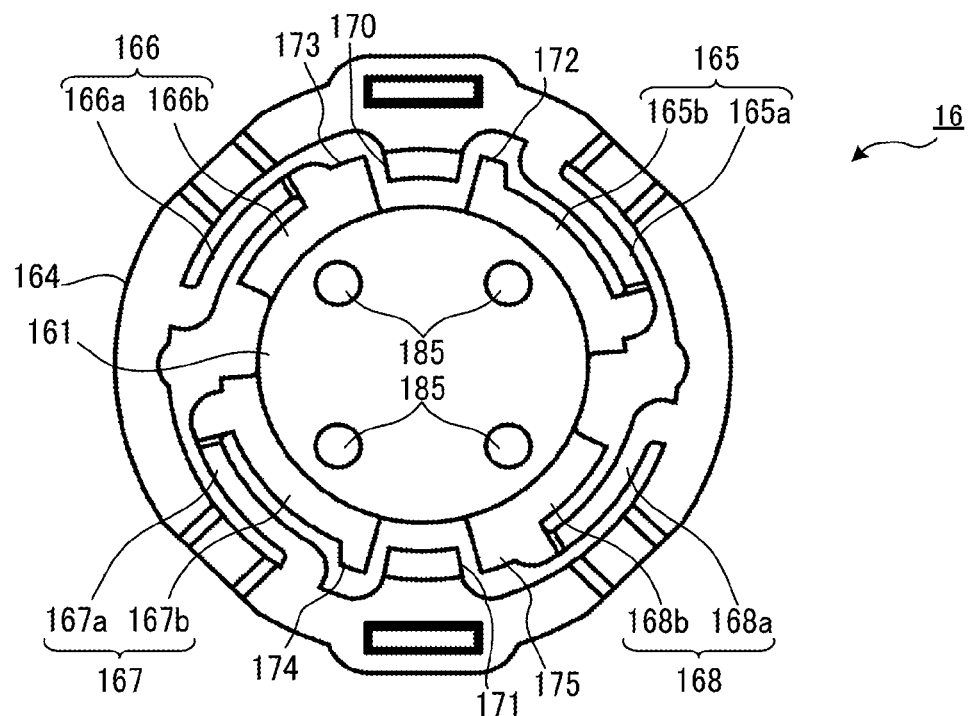
FIG. 18 is a bottom view illustrating the leg.
Figure 19:
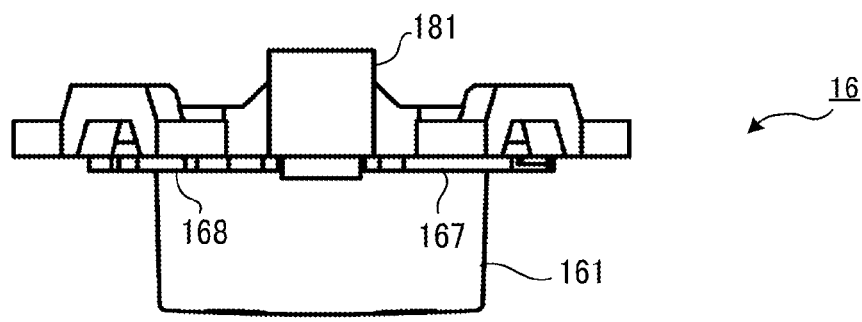
FIG. 19 is a front view illustrating the leg.
Figure 20:
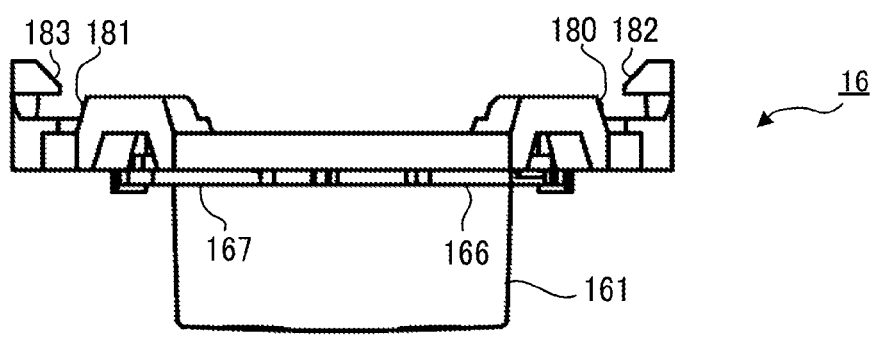
FIG. 20 is a side view illustrating the leg.
Figure 21:
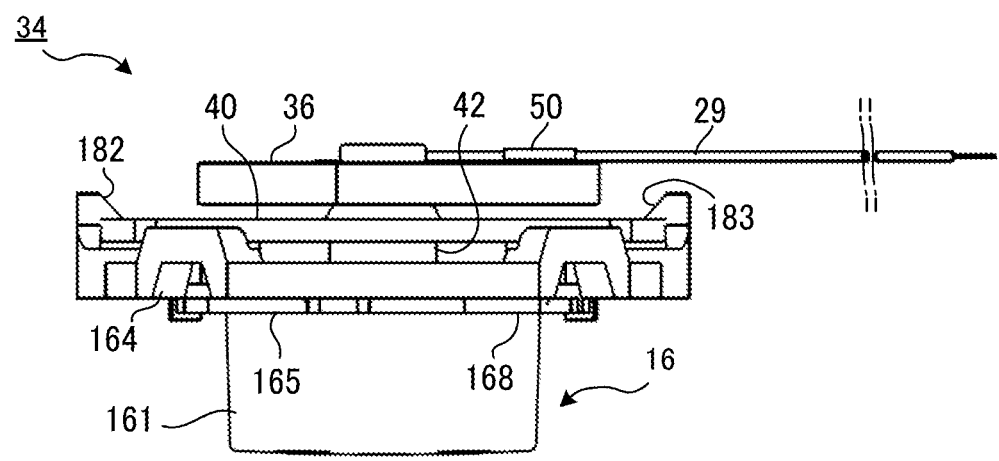
FIG. 21 is a side view illustrating the load cell inside the load cell assembly.

As illustrated in FIGS. 14, 15, and 17 to 20, the leg 16 includes a cylindrical leg body 161 and an annular edge portion 164 disposed around the leg body 161. The bridge 40 is put on the leg body 161. The upper surface of the leg body 161 is provided with a concave portion 162, and the concave portion 162 is provided with a portion into which the lower portion 422 of the elastic support member 42 is fitted. As illustrated in FIG. 17, the lower surface of the concave portion 162 is provided with a plurality of approximately rectangular elongated holes 163, and the lower surface of the concave portion 162 is formed in a lattice shape due to the elongated holes 163. Further, the leg body 161 is placed so that its lower surface comes into direct contact with the floor, and is supported by the floor. However, a separate component (for example, a carpet leg to be described later) may be interposed between the leg body 161 and the floor. The leg 16 is, for example, a single member that is formed of resin.

As illustrated in FIGS. 14, 15, 17, and 18, the leg body 161 and the edge portion 164 are connected to each other by four curved elastic connection portions 165, 166, 167, and 168. The elastic connection portions 165, 166, 167, and 168 are arranged at the angular interval of about 90°, and each of the elastic connection portions 165, 166, 167, and 168 includes an outer portion which is longitudinally elongated in an S-shape and is connected to the inner periphery of the edge portion 164 and a circular-arc disk-like inner portion which is connected to the outer periphery of the upper end of the leg body 161. The elastic connection portions 165, 166, 167, and 168 are formed to be thin and slim. In particular, in the elastic connection portions 165, 166, 167, and 168, the outer portions 165a, 166a, 167a, and 168a which are longitudinally elongated in an S-shape near the edge portion 164 are formed to be thinner and slimmer than the circular-arc disk-like inner portions 165b, 166b, 167b, and 168b near the leg body 161. Accordingly, the elastic connection portions 165, 166, 167, and 168, and particularly, the outer portions 165a, 166a, 167a, and 168a have extremely high flexibility. Furthermore, in the embodiment, the elastic connection portions 165, 166, 167, and 168 have a curved shape, but the invention is not limited thereto. For example, the elastic connection portions may be formed in a linear shape.

The leg 16 includes two first protrusions 170 and 171 which protrude inward from the edge portion 164. Further, the leg 16 includes a second protrusion 172 which is integrally connected to the inner portion 165b of the elastic connection portion 165 and protrudes from the elastic connection portion 165 in the circumferential direction about the axis of the leg body 161, a second protrusion 173 which is integrally connected to the inner portion 166b of the elastic connection portion 166 and protrudes from the elastic connection portion 166 in the circumferential direction about the axis of the leg body 161, a second protrusion 174 which is integrally connected to the inner portion 167b of the elastic connection portion 167 and protrudes from the elastic connection portion 167 in the circumferential direction about the axis of the leg body 161, and a second protrusion 175 which is integrally connected to the inner portion 168b of the elastic connection portion 168 and protrudes from the elastic connection portion 168 in the circumferential direction about the axis of the leg body 161. The first protrusion 170 is disposed between the second protrusions 172 and 173, and the second protrusions 172 and 173 are adjacent to the first protrusion 170 in the circumferential direction about the axis of the leg body 161. The first protrusion 171 is disposed between the second protrusions 174 and 175, and the second protrusions 174 and 175 are adjacent to the first protrusion 171 in the circumferential direction about the axis of the leg body 161. The first protrusions 170 and 171 and the second protrusions 172, 173, 174, and 175 serve as rotation preventing portions which regulate the rotation of the leg body 161 with respect to the edge portion 164.

The bridge 40 is attached to the edge portion 164 of the leg 16. The first protrusions 170 and 171 of the edge portion 164 are respectively provided with convex portions 180 and 181 which protrude upward in a cylindrical shape. As illustrated in FIG. 5, the convex portions 180 and 181 are inserted into the penetration holes 406 and 407 of the bridge 40. Further, the edge portion 164 of the leg 16 is provided with hooks 182 and 183, and the hooks 182 and 183 regulate the upward movement of the bridge 40. Accordingly, the vertical movement and the horizontal movement (the linear movement and the rotational movement) of the bridge 40 with respect to the edge portion 164 of the leg 16 are restricted. In other words, the vertical movement and the horizontal movement (the linear movement and the rotational movement) of the edge portion 164 with respect to the bridge 40 are restricted.

Figure 22:
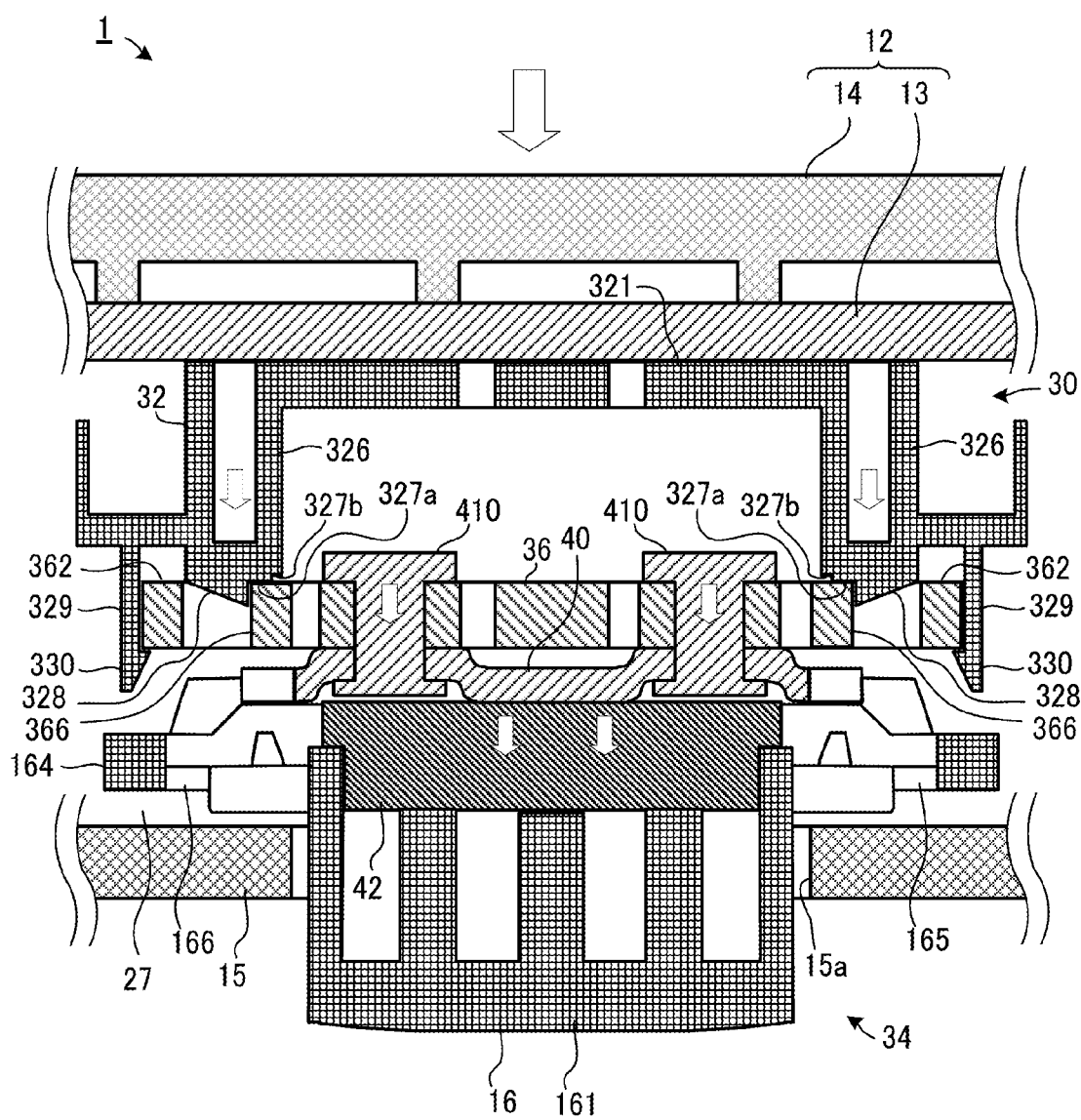
FIG. 22 is a cross-sectional view taken along the line XXII-XXII of FIG. 3.

FIG. 22 is a cross-sectional view illustrating the periphery of one load cell assembly 30 of the weight measuring device 1. In FIG. 22, the arrow indicates a load. The load which is applied to the outer cover 14 of the platform 12 is transferred to the flexure element 36 through the inner cover 13 and the load transferring member 32. Then, the load is transferred from the flexure element 36 to the elastic support member 42 through the bridge 40, is further transferred to the leg body 161 of the leg 16, and is received by the floor.

In the embodiment, the elastic support member 42 supports the bridge 40. The bridge 40 includes an approximately flat lower surface which extends horizontally during the weight measurement. During the weight measurement, the upper surface of the elastic support member 42 adheres to the approximately flat lower surface of the bridge 40 in a contact state. Accordingly, even when an excessive load or a repetitive load is applied to the weight measuring device 1, it is possible to reduce a concern that a load concentrates on a local position so that part of the components are broken, and hence to maintain the measurement accuracy for a long period of time. Further, since there is no protrusion on which the load locally concentrates and there is no component in contact with such a protrusion, there is no need to use an expensive material for such a component or perform a heat treatment to increase the hardness thereof, and hence the manufacturing cost of the weight measuring device 1 may be reduced.

Further, the posture of the flexure element 36 is appropriately maintained by the elastic deformation of the elastic support member 42. For example, when the heights of two first arm portions 362 or two second arm portions 364 of the flexure element 36 are different from each other, the weight measurement accuracy deteriorates. However, this degradation is reduced or prevented by the elastic deformation of the elastic support member 42. Further, since the elastic support member 42 has an impact reducing function, even when an impact is applied to the weight measuring device 1, the looseness of the components of the weight measuring device 1 is reduced or prevented, and hence the long lifetime of the weight measuring device 1 is ensured.

In the leg 16, the leg body 161 which intensively receives the load is connected to the edge portion 164 which regulates the movement of the bridge 40 by the elastic connection portions 165, 166, 167, and 168 with high flexibility. Due to the elastic connection portions 165, 166, 167, and 168 with high flexibility, an unnecessary force is prevented from being applied from the edge portion 164 to the leg body 161.

In the weight measuring device 1, the base 15 is connected to the platform 12 and defines the accommodation space 27 along with the platform 12. The accommodation space 27 accommodates most of each load cell assembly 30 (the upper portion of the leg 16, the load transferring member 32, the flexure element 36, the strain gauges 38, the bridge 40, and the elastic support member 42). However, as illustrated in FIG. 22, the base 15 includes base penetration holes 15*a*, and the lower portion of each leg 16 protrudes from the accommodation space 27 toward the lower side of the base 15 through the base penetration hole 15*a*. Then, the legs 16 are not fixed to the base 15, and the base 15 displaces in the vertical direction with respect to the legs 16 along with the platform 12.

In a structure in which the legs are fixed to the base or the platform (a structure different from the embodiment), the flexure elements which are interposed between the legs and the platform are deformed in response to the load applied from the platform to the flexure elements and the force applied from the base to the flexure elements. When a load is applied to the platform, the base is slightly deformed, and hence the force applied from the base to the flexure elements changes in response to the posture of the base. Further, since the flexure elements are deformed by the load so that the base and the legs pull each other, the load applied to the flexure elements is changed. Further, when the elastic support members are provided as in the embodiment, the pulling force between the base and the legs further increases due to the elastic compressing deformation of the elastic support members. Theses degrade the measurement accuracy of the weight which is measured by the weight measuring device.

On the contrary, in the embodiment, the legs 16 are independent from the base 15 and the platform 12 without being fixed to the base 15 and the platform 12 and the base 15 and the platform 12 displace together with respect to the legs 16. Accordingly, the flexure elements 36 which are interposed between the legs 16 and the platform 12 are deformed in response to the load applied from the platform 12 to the flexure elements 36 and the force applied to the flexure elements 36 from the floor on which the legs 16 are placed. However, the embodiment is not limited to the configuration in which the legs 16 are independent from the base 15 and the platform 12. The invention may be also applied to the case where the legs 16 are fixed to the base 15 or the platform 12.

The elastic support member 42 is formed of rubber, but the elastic support member may be formed of the other elastic body, for example, a spring. The reason why the rubber-like elastic support member 42 is used in the embodiment is because rubber generally has high durability with respect to the repetitive load and the measurement error is small even when the leg 16, that is, the bridge 40 is inclined with respect to the horizontal surface during the weight measurement. Accordingly, even when the floor is slightly inclined or the weight measuring device is slightly inclined with respect to the floor, the measurement accuracy of the weight measured by the weight measuring device 1 is sufficiently ensured.

Figures 23, 24:
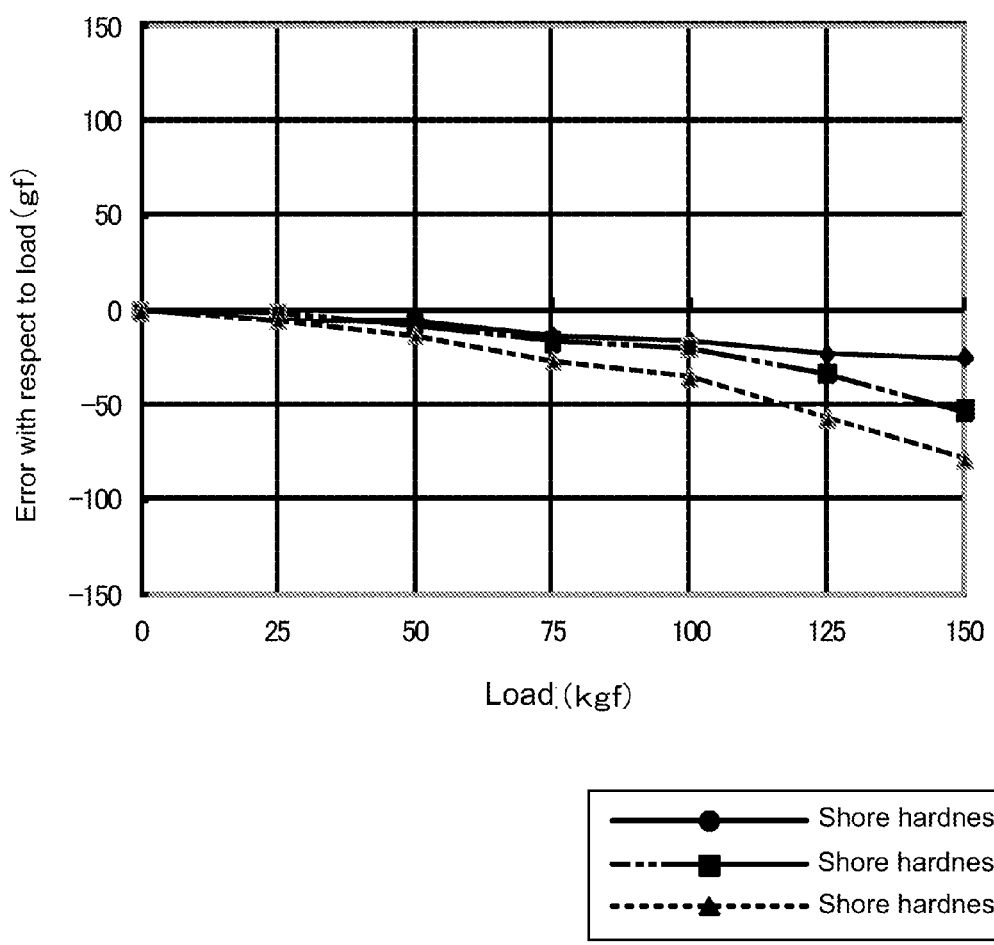
FIG. 23 is a table illustrating a test result obtained by examining a relation between the hardness of the elastic support member and the durability of the load cell assembly.
FIG. 24 is a graph illustrating a test result obtained by examining a relation between the hardness of the elastic support member and the weight measurement error.

FIG. 23 is a table illustrating a result of a durability test of the load cell assembly 30 which used the elastic support member 42 formed of different rubber. In this test, a load of 50 kgf was repetitively applied 20,000 times to the single load cell assembly 30.

No problem occurred in the load cell assemblies 30 which used the elastic support members 42 formed of rubber with Shore hardness A90 and Shore hardness A80. In the load cell assembly 30 which used the elastic support member 42 formed of rubber with Shore hardness A70, cracking occurred inside the leg 16 formed of resin, but when the number of times of the usage of the general weight scale is considered, the load cell assembly may be used in the weight measuring device 1. In the load cell assembly 30 which uses the elastic support member 42 formed of rubber with Shore hardness A60, cracking of the leg 16 formed of resin visibly occurred. Accordingly, it was proved that the elastic support member with Shore hardness A60 was poor. This is because of the reason set forth below. In case where the elastic support member 42 was formed of very smooth rubber, the compression of the elastic support member 42 in the vertical direction was very large, and the elastic support member 42 was excessively widened in the horizontal direction, thereby increasing the force of widening the leg 16 (see FIG. 15) to which the elastic support member 42 was fitted.

FIG. 24 is a graph illustrating a test result obtained by examining a relation between the hardness of the elastic support member 42 and the weight measurement error. In this test, the weight measurement value was examined by adding strain to the casing 11 of the weight measuring device 1. When the strain was added to the casing 11 of the weight measuring device 1, a flat wood board attached to smooth rubber was placed on the platform 12 and a weight was placed on the wood board. This was similar to a state in which a human stands on the platform 12. As illustrated in FIG. 24, an error with respect to the load occurred due to the strain added to the casing 11. There was a tendency that the error increased as the rubber became rigid. Further, it is considered that the same result will be obtained even when the leg 16, that is, the weight measuring device 1 is inclined with respect to the floor according to the experimental rule. However, according to the test result illustrated in FIG. 24, it was determined that the weight measurement error with respect to rubber with Shore hardness A70 to Shore hardness A90 was not so large, so that any practical problem did not occur even at the load of 150 kgf. The error with respect to rubber with Shore hardness A90 was about 80 gf at the load of 150 kgf and was about 60 gf at the load of 125 kgf. In case of the rubber harder than Shore hardness A90, it is considered that the measurement accuracy further decreases.

It is desirable that the hardness of the elastic support member 42 is from Shore hardness A70 to Shore hardness A90 due to the test results according to FIGS. 23 and 24. When the hardness of the elastic support member 42 formed of rubber is from Shore hardness A70 to Shore hardness A90, the durability with respect to the repetitive load is high. Further, even when the leg 16, that is, the bridge 40 is inclined with respect to the horizontal surface during the weight measurement, the measurement error is small.

It is desirable that the hardness of the elastic support member 42 be from Shore hardness A75 to Shore hardness A85. In the test according to FIG. 23, cracking occurred inside the leg 16 formed of resin in the load cell assembly 30 which uses the elastic support member 42 formed of the rubber with Shore hardness A70, but no problem occurred in the load cell assembly 30 which uses the elastic support member 42 formed of the rubber with Shore hardness A80. For this reason, it is considered that the rubber having high hardness of Shore hardness A75 or more was more satisfactory from the viewpoint of durability. In the test according to FIG. 24, the error in the case of the rubber with Shore hardness A90 was about 60 gf at the load of 125 kgf and the error in the case of the rubber with Shore hardness A80 was about 30 gf at the load of 125 kgf. When it is assumed that the allowable error at the load of 125 kgf is 50 gf, it is considered that the rubber with hardness of Shore hardness A85 or less is desirable.

As described above by referring to FIG. 10, the lower region 327 of each side wall 326 includes the flat lower contact surface 327a which comes into surface-contact with part of the first arm portion 362 of the flexure element 36 and the flat lower non-contact surface 327b which faces the first arm portion 362 of the flexure element 36 in a non-contact state. A step is formed between the lower contact surface 327a and the lower non-contact surface 327b. The lower contact surface 327a comes into surface-contact with part of the first arm portion 362 of the flexure element 36, and extends horizontally during the weight measurement. The lower contact surface 327a extends in a direction parallel to the symmetric axis of the flexure element 36, that is, the direction in which the first arm portion 362 extends. Accordingly, when the load is applied to the platform 12, change in the posture of the two first arm portions 362 of the fixture element 36 which receive the load from the platform 12 is slight. Further, the lower region 327 of each of the two side walls 326 is provided with not only the lower contact surface 327a but also the lower non-contact surface 327b. That is, only part (the lower contact surface 327a) of the lower region 327 comes into surface-contact with part of the first arm portion 362 of the flexure element 36, and the other part (the lower non-contact surface 327b) faces the first arm portion 362 in a non-contact state. In this way, since the lower contact surface 327a which is in contact with the first arm portion 362 in two side walls 326 of the load transferring member 32 is restricted, the first arm portion 362 of the flexure element 36 is in contact with the lower contact surface 327a in a surface with a narrow width in a manner similar to a line-contact type. In a case where the first arm portion 362 of the flexure element 36 is in contact with the lower contact surface 327a in a surface with a very wide width, the load concentration portion in the first arm portion 362 of the flexure element 36 changes depending on the magnitude of the load. However, in the embodiment, since the first arm portion 362 of the flexure element 36 is in contact with the lower contact surface 327a in a surface with a very narrow width in a manner similar to the line-contact type, the load concentration portion in the first arm portion 362 of the flexure element 36 does not substantially change depending on the magnitude of the load. Further, the portion corresponding to the lower non-contact surface 327b which is not in contact with the first arm portion 362 in two side walls 326 ensures the large thickness of the side wall 326, and contributes to the suppression of the deformation of the load transferring member 32. Accordingly, in the embodiment, when the load is applied to the platform 12, change in the posture of two arm portions of the flexure element 36 which receive the load from at least the platform 12 is an extremely small regardless of the magnitude of the load, and hence the measurement accuracy of the weight measuring device 1 is ensured.

Each first arm portion 362 includes the first penetration hole 366 which is directed to extend in the vertical direction during the weight measurement, the lower region 327 of each side wall 326 of the load transferring member 32 is provided with the protrusion 328 to be inserted into the first penetration hole 366, and the lower contact surface 327a is widened to the periphery of the protrusion 328. Since the protrusions 328 are fitted into the first penetration holes 366 directed to extend in the vertical direction during the weight measurement, the relative movement of the flexure element 36 and the load transferring member 32 in the horizontal direction is prevented. Further, since the lower contact surface 327a is widened to the periphery of the protrusion 328 fitted into the first penetration hole 366, even when a load is applied to a position biased from the protrusion 328 of the load transferring member 32, the lower contact surface 327a and the first arm portion 362 of the flexure element 36 come into contact with each other in the horizontal surface, and hence the measurement accuracy of the weight measuring device 1 is ensured.

Figure 25:
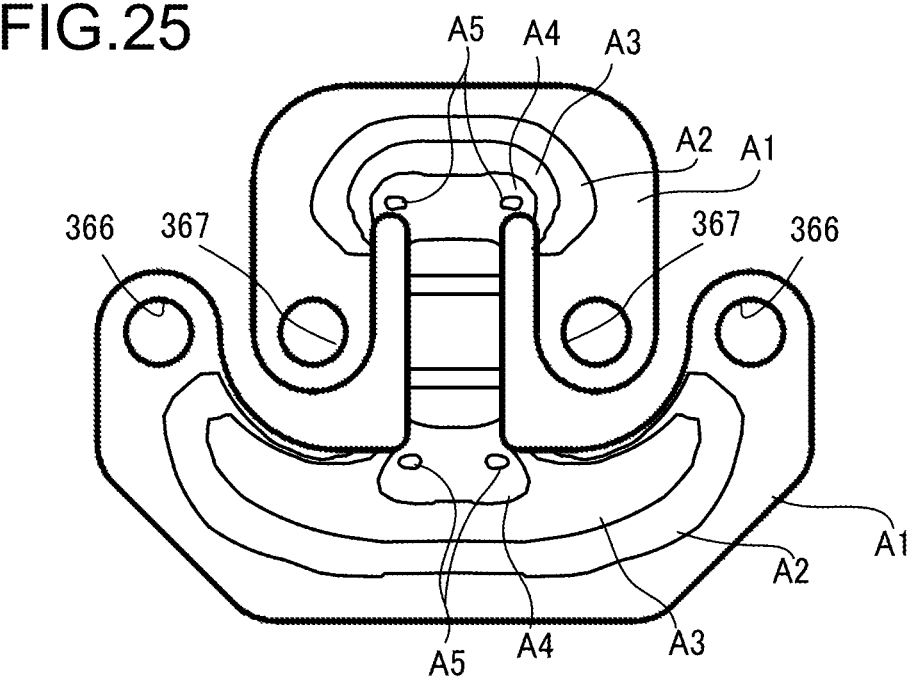
FIG. 25 is a diagram illustrating a distribution of stress generated in the flexure element during the weight measurement.

FIG. 25 is a diagram illustrating a distribution of stress generated in the flexure element 36 during the weight measurement. The stress distribution may be obtained by a computer simulation. Regions A1 receive minimum stress, and regions A5 receive maximum stress. As the number associated with the region A decreases, the amount of the generated stress is small. As apparent from the comparison in FIGS. 10 to 25, the lower contact surface 327a of the lower region 327 of the side wall 326 of the load transferring member 32 is in contact with a portion (a portion having small strain) corresponding to the stress regions A1 and A2 in the flexure element 36. Accordingly, the regions A1 and A2 of the flexure element 36 receive the load from the lower contact surface 327a of the lower region 327 of the side wall 326 of the load transferring member 32 in a stable posture, and hence the measurement accuracy of the weight measuring device 1 is ensured.

As described above by referring to FIG. 10, the load transferring member 32 further includes two outer side walls 329 which are disposed at the outside of the two side walls 326 and extend in parallel to the two side walls 326, and each outer side wall 329 is provided with the hooks 330 to which the first arm portion 362 of the flexure element 36 is hooked. Since the flexure element 36 is hooked to the hook 330 of the load transferring member 32, the flexure element 36 and the load transferring member 32 may be integrally attached to and detached from the platform 12. Accordingly, these components may be easily handled.

As described above by referring to FIGS. 14, 15, 17, and 18, each leg 16 includes two first protrusions 170 and 171 which protrude inward from the edge portion 164 and the second protrusions 172, 173, 174, and 175 which are integrally connected to the elastic connection portions 165, 166, 167, and 168. The first protrusion 170 is disposed between the second protrusions 172 and 173, and the second protrusions 172 and 173 are adjacent to the first protrusion 170 in the circumferential direction about the axis of the leg body 161. The first protrusion 171 is disposed between the second protrusions 174 and 175, and the second protrusions 174 and 175 are adjacent to the first protrusion 171 in the circumferential direction about the axis of the leg body 161. For this reason, even when a large torque is applied to the leg body 161 in a state where the rotation of the edge portion 164 about the axis is restrained, the first protrusion 170 is in contact with the second protrusion 172 or 173, the first protrusion 171 is in contact with the second protrusion 174 or 175, and the rotation of the leg body 161, that is, the deformation of the elastic connection portions 165, 166, 167, and 168 is restricted, thereby preventing the breakage of the elastic connection portions 165, 166, 167, and 168 disposed around the leg body 161.

As described above by referring to FIG. 5, the convex portions 180 and 181 of the edge portion 164 of the leg 16 are inserted into the penetration holes 406 and 407 of the bridge 40, so that the horizontal movement (the linear movement and the rotational movement) of the edge portion 164 with respect to the bridge 40 is restricted. As described above, the flexure element 36 is fixed to the bridge 40 by the rivet 410 (see FIGS. 11 and 22). Further, the flexure element 36 is attached to the load transferring member 32 so that the horizontal movement of the flexure element 36 with respect to the load transferring member 32 is restricted in a manner such that two protrusions 328 of the load transferring member 32 are fitted into two first penetration holes 366 of the flexure element 36 (see FIGS. 10 and 22). The movement of the load transferring member 32 with respect to the platform 12 is prevented in a manner such that the protrusions 322, 323, 324, and 325 (see FIGS. 4 to 6) are locked to the inner cover 13 of the platform 12. Accordingly, the edge portion 164 of the leg 16 is regulated so that the edge portion does not rotate with respect to the platform 12. That is, in the configuration of the weight measuring device 1, the rotation of the edge portion 164 about the axis is restrained by the bridge 40, the flexure element 36, the load transferring member 32, and the platform 12. Accordingly, in a configuration in which the leg 16 is not provided with the first protrusions 170 and 171 and the second protrusions 172, 173, 174, and 175, there is a concern that the elastic connection portions 165, 166, 167, and 168 may be broken when a large torque is applied to the leg body 161. However, even when a large torque is applied to the leg body 161, the rotation of the leg body 161, that is, the deformation of the elastic connection portions 165, 166, 167, and 168 is restricted by means of the function of the first protrusions 170 and 171 and the second protrusions 172, 173, 174, and 175, and hence the breakage of the elastic connection portions 165, 166, 167, and 168 disposed around the leg body 161 is prevented.

Figure 26:
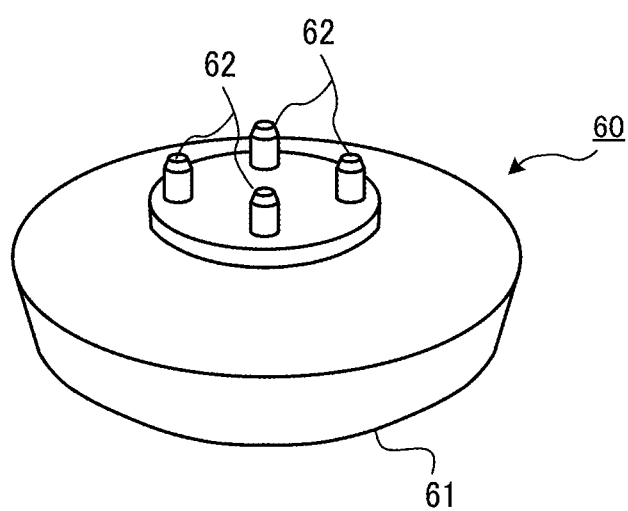
FIG. 26 is a perspective view illustrating a carpet leg attachable to the leg.

The effect of the first protrusions 170 and 171 and the second protrusions 172, 173, 174, and 175 is useful particularly when a carpet leg is attached to each leg 16. FIG. 26 is a perspective view illustrating such a carpet leg 60. The carpet leg 60 is, for example, a substantially disk-like component which is formed of resin, and includes a flat lower surface 61. A plurality of protrusions 62 protrude upward at the center of the upper portion of the carpet leg 60. These protrusions 62 are respectively inserted into a plurality of holes 185 which are formed in the lower surface of the leg body 161 of the leg 16. In this way, the carpet leg 60 is detachably attached to the leg body 161. The diameter of the carpet leg 60 is much larger than that of the leg body 161. Accordingly, when the carpet leg 60 is attached to the leg body 161, a large torque may be easily applied from the carpet leg 60 to the leg body 161. Since the first protrusions 170 and 171 and the second protrusions 172, 173, 174, and 175 serve as rotation preventing portions which regulate the rotation of the leg body 161 with respect to the edge portion 164, the breakage of the elastic connection portions 165, 166, 167, and 168 is prevented even when a large torque is applied to the leg body 161.

Figure 27:
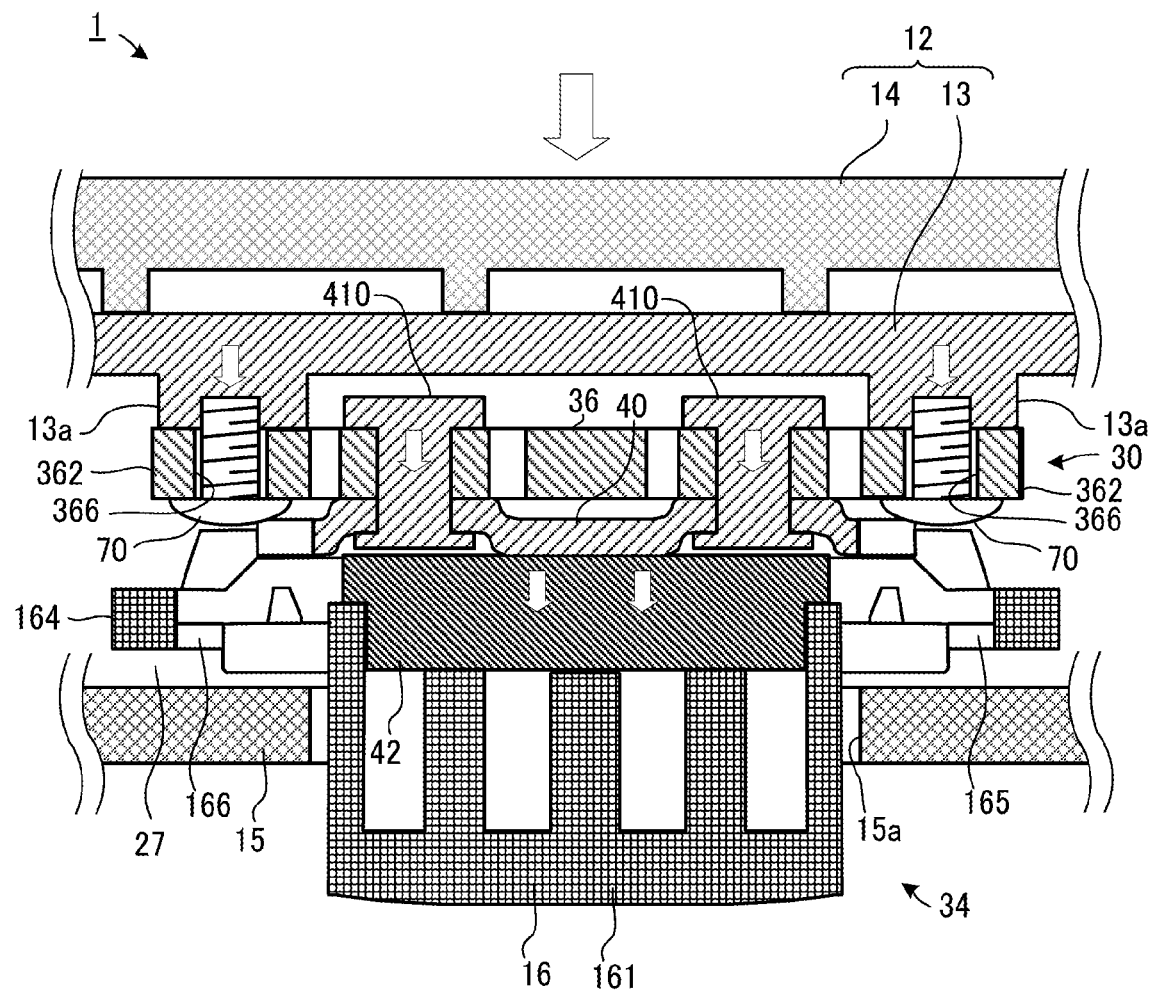
FIG. 27 is a cross-sectional view illustrating a weight measuring device according to another embodiment.

FIG. 27 is a cross-sectional view illustrating the weight measuring device 1 according to another embodiment and is a diagram seen as in FIG. 22. The weight measuring device 1 does not include the load transferring member 32, and the load is directly applied from the platform 12 to the flexure element 36. The lower surface of the inner cover 13 of the platform 12 is provided with bosses 13*a*, and each boss 13*a* is provided with a screw hole. The first arm portions 362 of the flexure element 36 abut against the bosses 13*a*, and screws 70 passing through the first penetration holes 366 formed in the first arm portions 362 are restrained by the screw holes of the bosses 13*a*. In this way, the flexure element 36 is directly fixed to the inner cover 13.

In FIG. 27, the arrow indicates the load. The load which is applied to the outer cover 14 of the platform 12 is transferred to the flexure element 36 through the inner cover 13. Then, the load is transferred from the flexure element 36 to the elastic support member 42 through the bridge 40, and is further transferred to the leg body 161 of the leg 16, whereby the load is received by the floor.

Even in any embodiment, it is desirable that the flexure element 36 be formed by powdered metallurgy. By forming the flexure element by powdered metallurgy, a decrease in the size of the flexure element 36 is ensured along with the mechanical strength compared to punching. Further, since the dimension accuracy in the thickness and the width of the flexure element 36 is high in such case, the weight measurement accuracy of the load cell is improved. As the method for powdered metallurgy, the metallic powder may be press-molded and sintered, and the metallic powder injection molding method (MIM) may be employed.

Referring to FIG. 9, the desirable dimension of the flexure element 36 will be described. Preferably, a gap G1 between the first arm portion 362 and the second arm portion 364 and a gap G2 between the second arm portion 364 and the strain region 361 are equal to or smaller than a half of the thickness of the flexure element 36. Since the gaps G1 and G2 are set to be small, a decrease in the size of the flexure element 36 (particularly, a decrease in the length in the lateral direction of FIG. 9) is realized. In the high-strength metallic material appropriate for the flexure element, the gap in the punching process may be set to be only equal to the thickness of the flexure element 36, and may not be thinner than the thickness. However, the gap may be thinned by the powdered metallurgy, and hence the flexure element 36 may be decreased in size.

Preferably, the length L1 of each first arm portion 362 in a direction perpendicular to the symmetric axis of the flexure element 36 is 1.3 times or more the length L2 of the strain region 361 in a direction crossing the symmetric axis of the flexure element 36. Each first arm portion 362 is provided with the first penetration hole 366, and may be screw-fixed to another component (the inner cover 13 in the embodiment of FIG. 27) by using the penetration hole of the first penetration hole 366. When the gap L1 between the two outer surfaces of each first arm portion 362 is large, it is possible to decrease the residual stress in the first arm portion 362 caused by the screwing torque generated when fastening the screw 70. Since the residual stress adversely affects the weight measurement accuracy of the load cell, it is desirable that the residual stress be small. When the length L1 of each first arm portion 362 in a direction perpendicular to the symmetric axis of the flexure element 36 is 1.3 times or more the length L2 of the strain region 361 in a direction crossing the symmetric axis of the flexure element 36, the residual stress is reduced, and hence the weight measurement accuracy of the load cell may be improved.

Preferably, the length L3 of the first connection portion 363 in a direction parallel to the symmetric axis of the flexure element 36 is 1.4 times or more the length L2 of the strain region 361 in a direction crossing the symmetric axis of the flexure element 36. When the length L3 of the first connection portion 363 in a direction parallel to the symmetric axis of the flexure element 36 is large, it is possible to reduce the residual stress in the first arm portion 362 caused by the screwing torque generated when fastening the screw 70. Since the residual stress adversely affects the weight measurement accuracy of the load cell, it is desirable that the residual stress be small. When the length L3 of the first connection portion 363 in a direction parallel to the symmetric axis of the flexure element 36 is 1.4 times or more the length L2 of the strain region 361 in a direction crossing the symmetric axis of the flexure element 36, the residual stress is reduced, and hence the weight measurement accuracy of the load cell may be improved.

Figure 28:
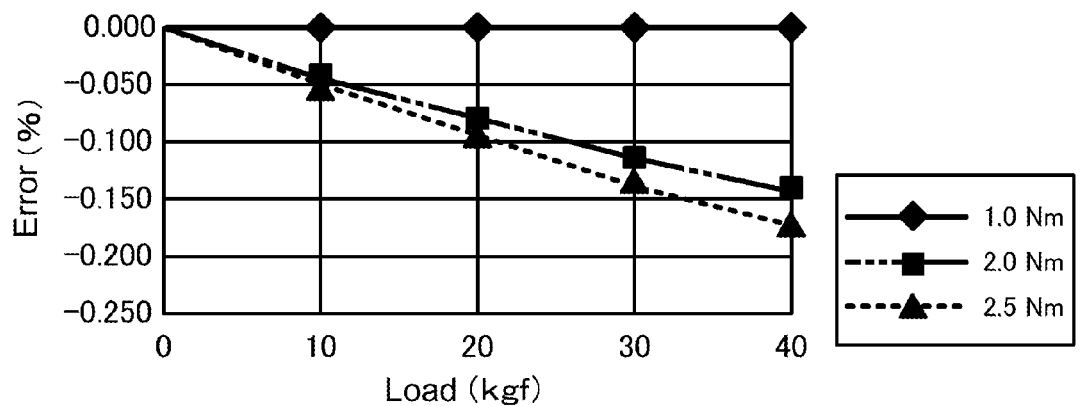
FIG. 28 is a graph illustrating a test result obtained by examining a relation between the dimension of the flexure element and the weight measurement error.
Figure 29:
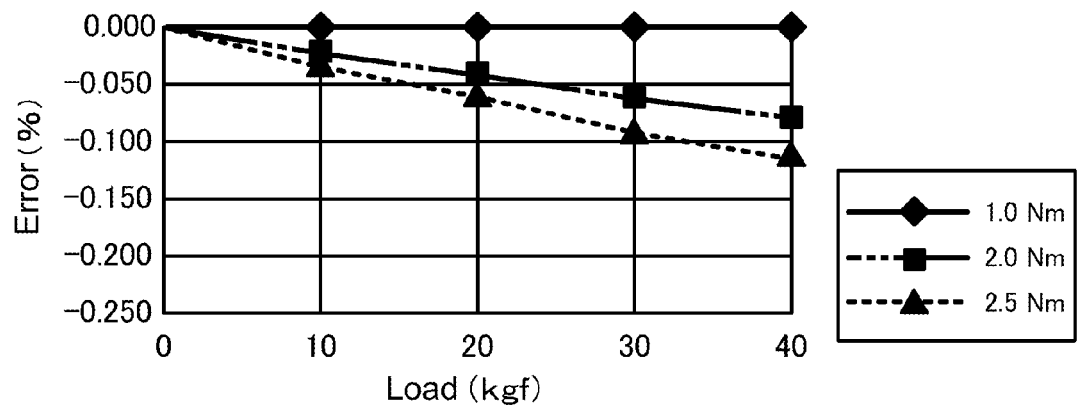
FIG. 29 is a graph illustrating a test result obtained by examining a relation between the dimension of the flexure element and the weight measurement error.
Figure 30:
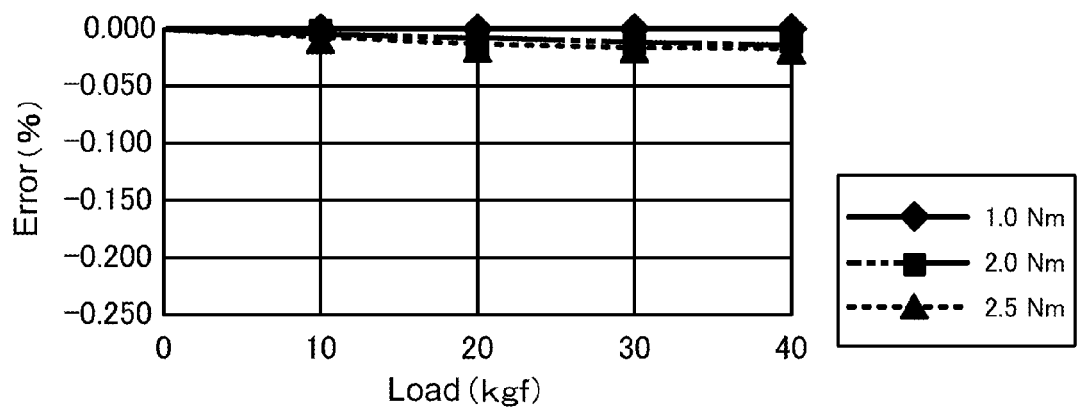
FIG. 30 is a graph illustrating a test result obtained by examining a relation between the dimension of the flexure element and the weight measurement error.

FIGS. 28 to 30 are graphs illustrating results obtained by examining the weight measurement error by changing the gap L1 and the length L3. FIG. 28 illustrates a relation between the weight measurement error and the screwing torque of the screw 70 in case of L1/L2=86% and L3/L2=86%. FIG. 29 illustrates a relation between the weight measurement error and the screwing torque of the screw 70 in case of L1/L2=93% and L3/L2=100%. FIG. 30 illustrates a relation between the weight measurement error and the screwing torque (1.0 Nm, 2.0 Nm, and 2.5 Nm) of the screw 70 in case of L1/L2=130% and L3/L2=140%. As apparent from these drawings, the measurement error increased as the screwing torque increased. This is because the residual stress in the first arm portion 362 caused by the screwing torque generated when fastening the screw 70 adversely affected the measurement. However, the weight measurement error when L1/L2=130% and L3/L2=140% as illustrated in FIG. 30 was remarkably smaller than those of the other results illustrated in FIGS. 28 and 29. Accordingly, it is understood that a remarkable effect is achieved when L1 is 1.3 times or more L2 and L3 is 1.4 times or more L2.

As described above, the flexure element 36 may be made by press-molding and sintering the metallic powder, or may be made in accordance with the metallic powder injection molding method. However, the inventors have found that it is desirable to manufacture the flexure element 36 by press-molding and sintering a specific kind of material. The specific kind of material is a metallic powder which includes at least vanadium (V) and chrome (Cr) and mainly includes iron (Fe). Hereinafter, the material will be described in detail.

The inventors have found that the mechanical strength of the flexure element 36 with a complex shape including the two first arm portions 362, the two second arm portions 364, the first connection portion 363, the second connection portion 365, and the like may be improved when chrome and vanadium are included in the metallic powder as the material of the flexure element 36. The inventors have found that a very appropriate strength may be ensured when 10.8% or more of chrome is included in the sintered metal obtained by sintering the metallic powder, as a result of trial and error. Meanwhile, when the amount of chrome is too large, the strength deteriorates and the manufacturing cost increases. The inventors have found that it is desirable that the content percentage of chrome of the sintered metal obtained by sintering the metallic powder is 18.2% or less in consideration of the balance of the strength and the cost as a result of trial and error. Accordingly, it is desirable that the sintered metal obtained by sintering the metallic powder include chrome of 10.8% to 18.2%.

Further, the inventors have found that a very appropriate strength may be ensured when 0.1% or more of vanadium is included in the sintered metal obtained by sintering the metallic powder as a result of trial and error. Meanwhile, when the amount of vanadium is too large, the manufacturing cost increases. In particular, since vanadium is very expensive, the cost largely increases when the amount is too large. The inventors have found that it is desirable that the content percentage of vanadium of the sintered metal obtained by sintering the metallic powder be 0.5% or less in consideration of the balance of the strength and the cost as a result of trial and error. Accordingly, it is desirable that the sintered metal obtained by sintering the metallic powder include vanadium of 0.1% to 0.5%.

When carbon is included in the metallic powder as the material of the flexure element 36, the hardness of the flexure element 36 is improved by the heat treatment after the sintering process, and further the mechanical strength of the flexure element 36 may be improved. The inventors have found that a very appropriate strength may be ensured when 0.5% or more of carbon is included in the sintered metal obtained by sintering the metallic powder as a result of trial and error. Meanwhile, when the amount of carbon is too large, the contraction amount of the material is large during the sintering process and the heat treatment, so that the dimension of the flexure element 36 varies. When the contraction amount of the material is large, the flexure element 36 with a complex shape including the two first arm portions 362, the two second arm portions 364, the first connection portion 363, the second connection portion 365, and the like may not be manufactured with high accuracy. The inventors have found that a variation in the dimension is appropriately suppressed when the content percentage of carbon of the sintered metal obtained by sintering the metallic powder is 1.8% or less in consideration of the strength and the cost as a result of trial and error. Accordingly, it is desirable that the sintered metal obtained by sintering the metallic powder include carbon of 0.5% to 1.8%.

While the weight measuring device as the weight scale which may be used as a body composition meter has been described, the invention relates to weight measurement, and another weight measuring device for measuring the weight of a subject other than a human and components thereof are also included in the scope of the invention. In the embodiment, the weight measuring device 1 is provided with four load cell assemblies, but the number of the load cell assemblies provided in the weight measuring device is not limited to four.

The preceding description has been presented only to illustrate and describe exemplary embodiments of the present the flexure element and the weight measuring device. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A flexure element which is used in a load cell measuring a weight, is deformed by a load transferred thereto, is formed by powdered metallurgy, and has an axisymmetric shape and an even thickness, the flexure element comprising:
   a rectangular strain region which is disposed at the center, extends in the same direction as that of the symmetric axis, and has one end and the other end;
   two first arm portions which extend in parallel to the symmetric axis;
   a first connection portion which extends in a direction crossing the symmetric axis and is connected to one end of the strain region and the first arm portions;
   two second arm portions which are disposed near the strain region in relation to the first arm portions and extend in parallel to the symmetric axis; and a second connection portion which extends in a direction crossing the symmetric axis and is connected to the other end of the strain region and the second arm portions, wherein one of the pair of first arm portions and the pair of second arm portions receives a load in a direction perpendicular to the flexure element, and the other of the pair of first arm portions and the pair of second arm portions is fixed to a support body, and a gap between the first arm portion and the second arm portion or a gap between the second arm portion and the strain region are equal to or smaller than a half of the thickness.

2. The flexure element according to claim 1, wherein the flexure element is obtained by press-molding and sintering a metallic powder.

3. The flexure element according to claim 1, wherein the flexure element is obtained by a metallic powder injection molding method.

4. The flexure element according to claim 2, the metallic powder including at least vanadium (V) and chrome (Cr) and mainly including iron (Fe)

wherein the sintered metal obtained by sintering the metallic powder includes carbon of 0.5% to 1.8%.

5. The flexure element according to claim 4, wherein sintered metal obtained by sintering the metallic powder includes chrome of 10.8% to 18.2%.

6. The flexure element according to claim 4, wherein the sintered metal obtained by sintering the metallic powder includes vanadium of 0.1% to 0.5%.

7. The flexure element according to claim 4, wherein the metallic powder further includes carbon (C).

8. The flexure element according to claim 4, wherein a gap between the first arm portion and the second arm portion or a gap between the second arm portion and the strain region are equal to or smaller than a half of the thickness.

9. The flexure element according to claim 1, wherein the first arm portions receive a load in a direction perpendicular to the flexure element and the second arm portions are fixed to the support body.

10. The flexure element according to claim 1, wherein the length of each first arm portion in a direction perpendicular to the symmetric axis of the flexure element is 1.3 times or more the length of the strain region in a direction crossing the symmetric axis of the flexure element.

11. The flexure element according to claim 1, wherein the length of the first connection portion in a direction parallel to the symmetric axis of the flexure element is 1.4 times or more the length of the strain region in a direction crossing the symmetric axis of the flexure element.

12. The flexure element according to claim 1, wherein each first arm portion is provided with a first penetration hole.

13. The flexure element according to claim 1, wherein each second arm portion is provided with a second penetration hole.

14. A weight measuring device comprising:

the flexure element according to claim 1; and a load cell which includes a plurality of strain gauges attached to the flexure element and generating a signal in response to the deformation of the flexure element.

* * * * *